(12) United States Patent (10) Patent No.: US 12,528,103 B2
Sasaki et al. (45) Date of Patent: Jan. 20, 2026

(54) ACOUSTIC-WAVE GENERATING DEVICE

(71) Applicant: Murata Manufacturing Co., Ltd., Nagaokakyo (JP)

(72) Inventors: Shinichi Sasaki, Nagaokakyo (JP); Takaaki Asada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 463 days.

(21) Appl. No.: 18/215,327

(22) Filed: Jun. 28, 2023

(65) Prior Publication Data

US 2023/0338989 A1 Oct. 26, 2023

Related U.S. Application Data

(63) Continuation of application No. PCT/JP2021/037862, filed on Oct. 13, 2021.

(30) Foreign Application Priority Data

Mar. 3, 2021 (JP) ................................. 2021-033501

(51) Int. Cl.
B06B 1/02 (2006.01)
(52) U.S. Cl.
CPC ........ B06B 1/0215 (2013.01); *B06B 2201/40* (2013.01); *B06B 2201/51* (2013.01)
(58) Field of Classification Search
CPC .............. B06B 1/0215; B06B 2201/40; B06B 2201/51; H04R 3/00; H04R 23/00
See application file for complete search history.

(56) References Cited

U.S. PATENT DOCUMENTS

| | | | | |
|---|---|---|---|---|
| 4,668,906 A | * | 5/1987 | Ekstrand | H02M 7/219 323/354 |
| 6,864,802 B2 | * | 3/2005 | Smith | G08C 17/02 340/870.07 |
| 7,081,192 B1 | * | 7/2006 | Wang | B01L 3/502761 422/68.1 |

(Continued)

FOREIGN PATENT DOCUMENTS

| | | |
|---|---|---|
| JP | 2016120462 A | 7/2016 |
| WO | 2012020600 A1 | 2/2012 |
| WO | 2019159395 A1 | 8/2019 |

OTHER PUBLICATIONS

International Search Report in PCT/JP2021/037862, mailed Dec. 28, 2021, 3 pages.

(Continued)

*Primary Examiner* — Daniel L Murphy
*Assistant Examiner* — Amie M Ndure
(74) *Attorney, Agent, or Firm* — Keating & Bennett, LLP

(57) ABSTRACT

An acoustic-wave generating device includes a drive circuit and a power auxiliary circuit. The drive circuit includes a capacitor chargeable via a direct-current power supply, and a drive switch to cause power to be supplied from the capacitor to an acoustic-wave source which produces heat through energization to generate acoustic waves. The power auxiliary circuit is operable to supplies power to the drive circuit to avoid a decrease of power supplied to the acoustic-wave source in an operation of generating a series of acoustic waves from the acoustic-wave source through switching of the drive switch.

20 Claims, 13 Drawing Sheets

(56) References Cited

U.S. PATENT DOCUMENTS

| | | | | |
|---|---|---|---|---|
| 8,148,939 | B2* | 4/2012 | Kitagawa | H01M 10/46 320/112 |
| 2002/0075163 | A1* | 6/2002 | Smith | G01D 21/00 340/870.16 |
| 2002/0137059 | A1* | 9/2002 | Wu | B82Y 5/00 435/6.19 |
| 2009/0039833 | A1* | 2/2009 | Kitagawa | H01M 10/48 320/134 |
| 2010/0260984 | A1* | 10/2010 | Wu | B82Y 5/00 428/209 |
| 2016/0186730 | A1* | 6/2016 | Watanabe | F03G 7/0614 60/527 |

OTHER PUBLICATIONS

Written Opinion in PCT/JP2021/037862, mailed Dec. 28, 2021, 3 pages.

* cited by examiner

10A

ACOUSTIC-WAVE GENERATING DEVICE

CROSS REFERENCE TO RELATED APPLICATIONS

This application claims the benefit of priority to Japanese Patent Application No. 2021-033501 filed on Mar. 3, 2021 and is a Continuation Application of PCT Application No. PCT/JP2021/037862 filed on Oct. 13, 2021. The entire contents of each application are hereby incorporated herein by reference.

BACKGROUND OF THE INVENTION

1. Field of the Invention

The present disclosure generally relates to acoustic-wave generating devices. More particularly, the present disclosure relates to an acoustic-wave generating device in which power is supplied from a capacitor to an acoustic-wave source which produces heat through energization to generate acoustic waves.

2. Description of the Related Art

International Publication No. 2019/159395 discloses an acoustic-wave generating device. The acoustic-wave generating device according to International Publication No. 2019/159395 includes an acoustic-wave source, a switching device, a capacitor, and a limiting resistor. The acoustic-wave source produces heat through a current, which is supplied from a direct-current power supply, to generate acoustic waves. The limiting resistor is located between the direct-current power supply and the acoustic-wave source, and limits a current flowing from the direct-current power supply to the acoustic-wave source. The switching device is connected to the acoustic-wave source in series, and is switched on/off to control flowing/blocking a current which flows through the acoustic-wave source. The capacitor is connected in parallel to the series circuit of the acoustic-wave source and the switching device.

SUMMARY OF THE INVENTION

Preferred embodiments of the present invention provide acoustic-wave generating circuits which each achieve stabilization of sound pressure of a series of acoustic waves.

A preferred embodiment of the present invention provides an acoustic-wave generating device including a drive circuit and a power auxiliary circuit. The drive circuit includes a capacitor chargeable via a direct-current power supply, and a drive switch to cause power to be supplied from the capacitor to an acoustic-wave source which produces heat through energization to generate an acoustic wave. The power auxiliary circuit is operable to supply power to the drive circuit so as to avoid a decrease of power supplied to the acoustic-wave source in an operation of generating a series of acoustic waves from the acoustic-wave source through switching of the drive switch.

A preferred embodiment of the present invention provides an acoustic-wave generating device including a drive circuit and a power auxiliary circuit. The drive circuit includes a capacitor chargeable via a direct-current power supply, and a drive switch to cause power to be supplied from the capacitor to an acoustic-wave source which produces heat through energization to generate an acoustic wave. The power auxiliary circuit includes an inductor electrically connected between the direct-current power supply and the capacitor, and a charging switch electrically connected in parallel to a series circuit of the inductor and the direct-current power supply. The power auxiliary circuit supplies power to the drive circuit in the OFF period of the drive switch in an operation of generating a series of acoustic waves from the acoustic-wave source through switching of the drive switch.

Preferred embodiments of the present invention each achieve stabilization of the sound pressure of a series of acoustic waves.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiments

Preferred embodiments of the present invention will be described in detailed below with reference to the drawings.

1. First Preferred Embodiment

1-1. Overview

Figure 1:
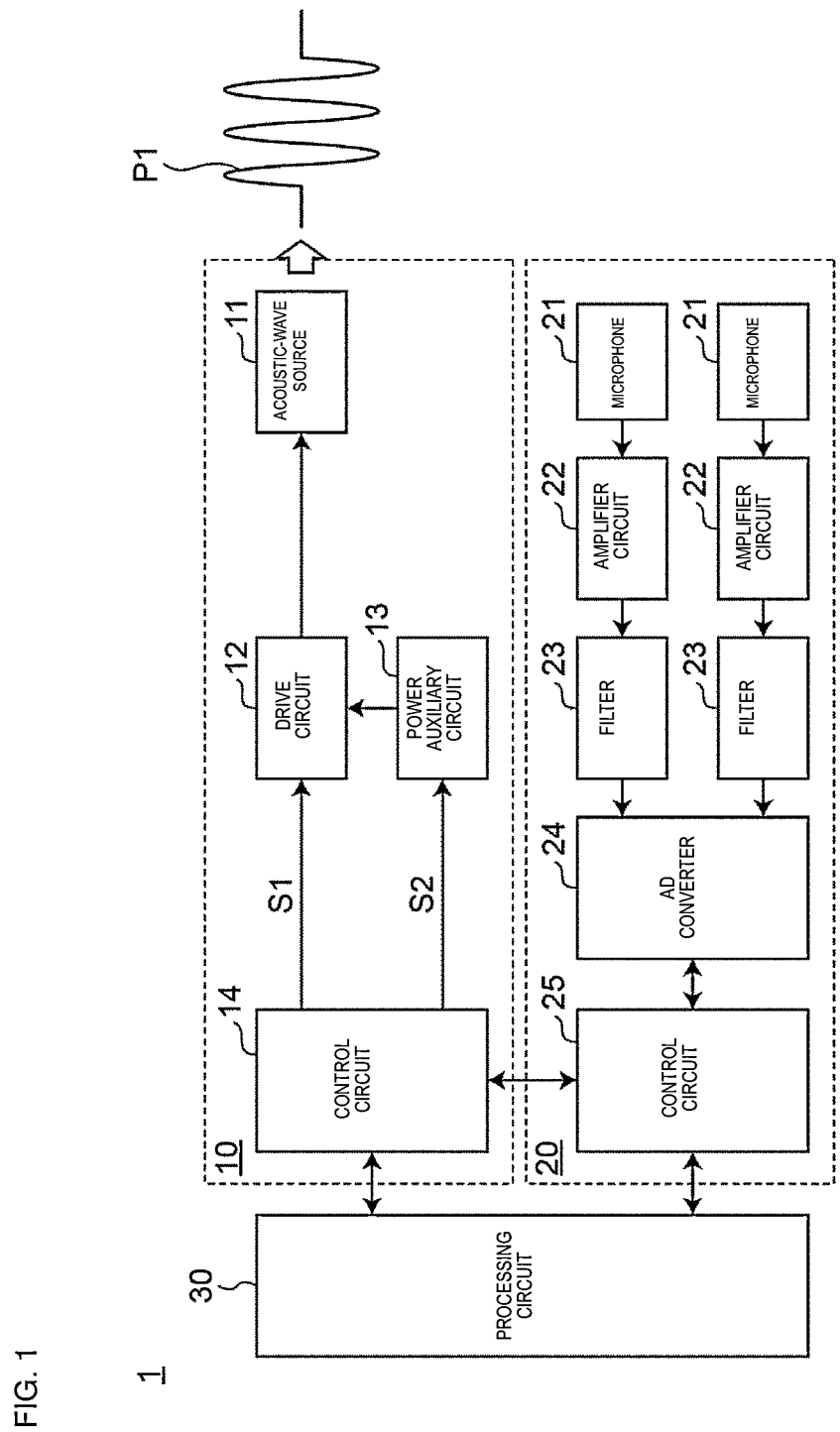
FIG. 1 is a block diagram illustrating an exemplary configuration of an object detection system including an acoustic-wave generating device according to a first preferred embodiment of the present invention.

FIG. 1 is a block diagram illustrating an exemplary configuration of an object detection system 1 including an acoustic-wave generating device 10 according to a first preferred embodiment of the present invention. The object detection system 1 is capable of detecting an object in a target space by using acoustic waves P1. For example, the object detection system 1 is used in a mobile define to detect an object, such as an obstacle. Examples of a mobile defines include a vehicle such as an automobile, an unmanned aircraft such as a drone, and an autonomous mobile robot. Examples of an autonomous mobile robot include a robot cleaner.

As illustrated in FIG. 1, the acoustic-wave generating device 10 generates acoustic waves P1. In the object detection system 1, the acoustic waves P1 are used to detect an object and measure the distance to the object. The acoustic-wave generating device 10 includes an acoustic-wave source 11, a drive circuit 12, and a power auxiliary circuit 13.

Figure 2:
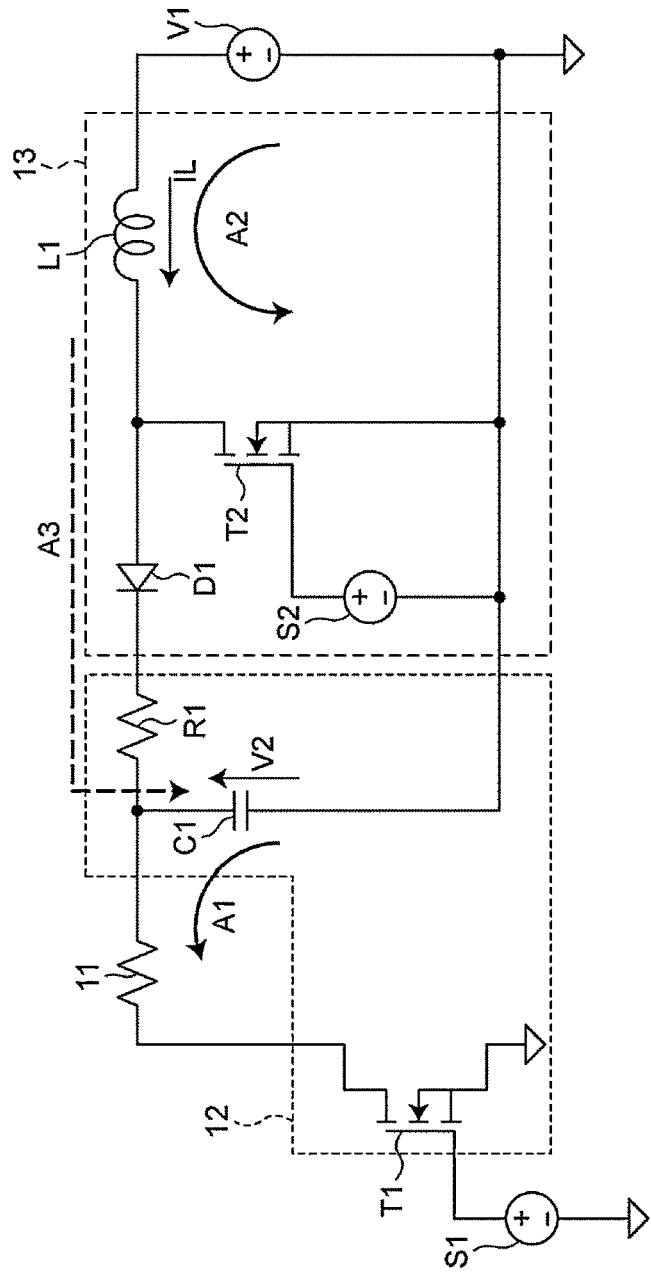
FIG. 2 is a circuit diagram illustrating an exemplary configuration of the acoustic-wave generating device in FIG. 1.

FIG. 2 is a circuit diagram illustrating an exemplary configuration of the acoustic-wave generating device 10. As illustrated in FIG. 2, the drive circuit 12 includes a capacitor C1 that is charged by using a direct-current power supply V1, and a drive switching device T1 to supply power from the capacitor C1 to the acoustic-wave source 11 which produces heat through energization to generate acoustic waves. The power auxiliary circuit 13 supplies power to the drive circuit 12 so as to avoid a decrease of power supplied to the acoustic-wave source 11 in an operation of generating a series of acoustic waves P1 from the acoustic-wave source 11 through switching of the drive switching device T1.

The acoustic-wave generating device 10 in FIG. 1, which includes the power auxiliary circuit 13, is capable of supplying enough power to the acoustic-wave source 11 also in an operation of generating a series of acoustic waves P1 from the acoustic-wave source 11 through switching of the drive switching device T1. This decreases a reduction, which is caused by a decrease of power supplied to the acoustic-wave source 11, of the sound pressure of the acoustic waves, or, in some cases, prevents such a reduction. Thus, a series of acoustic waves P1 may be output from the acoustic-wave source 11 while a reduction of the sound pressure of the series of acoustic waves P1 is decreased or prevented. As described above, the acoustic-wave generating device 10 achieves stabilization of the sound pressure of a series of acoustic waves P1. For example, a series of acoustic waves P1 may be output at the same sound pressure.

1-2. Details

The acoustic-wave generating device 10 and the object detection system 1 will be described below by referring to the drawings. As illustrated in FIG. 1, the object detection system 1 includes the acoustic-wave generating device 10, a wave receiving device 20, and a processing circuit 30.

1-2-1. Acoustic-Wave Generating Device

The acoustic-wave generating device 10 in FIG. 1 includes the acoustic-wave source 11, the drive circuit 12, the power auxiliary circuit 13, and a control circuit 14.

The acoustic-wave source 11 produces heat through energization to generate acoustic waves P1. More specifically, the acoustic-wave source 11 is a thermal excitation element which heats air to generate acoustic waves P1. The acoustic-wave source 11 is a so-called thermophone. The acoustic-wave source 11 includes, for example, a heating element, a substrate, a pair of electrodes, and a heat-insulating layer. The heating element is, for example, a resistive element which is heated by flowing a current therethrough. For example, the heating element is disposed on the substrate so as to be in contact with air. The air around the heating element expands or shrinks due to a temperature change of the heating element. This causes an occurrence of air pressure waves, that is, acoustic waves. The heat-insulating layer reduces or prevents heat transfer from the heating element to the substrate. The pair of electrodes are electrodes to flow a current from the outside of the acoustic-wave source 11 to the heating element. The pair of electrodes are provided, one on either side of the heating element. The acoustic-wave source 11 may have a known configuration of the related art, for example. Thus, detailed description of the acoustic-wave source 11 will be avoided.

As illustrated in FIG. 2, the acoustic-wave source 11 is electrically connected between the direct-current power supply V1 and the ground.

The direct-current power supply V1 includes, for example, various power supply circuits and/or batteries. Example of various power supply circuits include an AC/DC converter, a DC/DC converter, a regulator, and a battery. The voltage value of the direct-current power supply V1 is, for example, about 5 V.

The drive circuit 12 supplies power to the acoustic-wave source 11 to generate acoustic waves P1 from the acoustic-wave source 11. As illustrated in FIG. 2, the drive circuit 12 includes the capacitor C1, the drive switching device T1, and a resistor R1.

The capacitor C1 is used to supply power to the acoustic-wave source 11. The capacitor C1 is electrically connected between the ground and the connection point between the direct-current power supply V1 and the acoustic-wave source 11. The capacitor C1 is charged by using the direct-current power supply V1. The voltage value across the ends of the capacitor C1 in the stationary state may be considered to be equal or substantially equal to that of the direct-current power supply V1. The capacitor C1 is, for example, an electrolytic capacitor or a ceramic capacitor.

The drive switching device T1 is used to drive the acoustic-wave source 11 by controlling supply of power to the acoustic-wave source 11. The drive switching device T1 is electrically connected between the acoustic-wave source 11 and the ground. The drive switching device T1 is, for example, an n-MOSFET. When the drive switching device T1 is ON, power is supplied to the acoustic-wave source 11. As illustrated by using arrow A1 in FIG. 2, a current flows from the capacitor C1 to the acoustic-wave source 11 and power is supplied to the acoustic-wave source 11. When the drive switching device T1 is OFF, no power is supplied to the acoustic-wave source 11. Switching on/off the drive switching device T1 causes the acoustic-wave source 11 to generate acoustic waves P1. In the present disclosure, "an acoustic wave" indicates a sine wave for one cycle. In contrast, "a series of acoustic waves" indicates sine waves for multiple cycles.

The resistor R1 defines an overcurrent protective element which is electrically connected between the capacitor C1 and the direct-current power supply V1. The resistor R1 limits a current flowing directly from the direct-current power supply V1 to the acoustic-wave source 11. The resistor R1 may prevent excessive heating of the acoustic-wave source 11. The resistance value of the resistor R1 is, for example, greater than or equal to about 50Ω and less than or equal to about 5 kΩ.

The power auxiliary circuit 13 is provided separately from the direct-current power supply V1. The power auxiliary circuit 13 is used to supply power to the drive circuit 12 so as to avoid a decrease of power supplied to the acoustic-wave source 11 in an operation of generating a series of acoustic waves P1 from the acoustic-wave source 11 through switching of the drive switching device T1. In other words, the power auxiliary circuit 13 is a circuit to compensate for shortage of power supplied to the acoustic-wave source 11.

As illustrated in FIG. 2, the power auxiliary circuit 13 includes an inductor L1, a charging switching device T2, and a diode D1. The inductor L1 is electrically connected between the direct-current power supply V1 and the capacitor C1. In FIG. 2, the inductor L1 is electrically connected between the resistor R1, which is an overcurrent protective element, and the direct-current power supply V1. The charging switching device T2 is electrically connected in parallel to the series circuit of the inductor L1 and the direct-current power supply V1. The charging switching device T2 is, for example, an n-MOSFET. The inductor L1, the direct-current power supply V1, and the charging switching device T2 define a closed loop. When the charging switching device T2 is ON, energy is accumulated in the inductor L1. As illustrated by using arrow A2 in FIG. 2, a current flows through the closed loop, which is defined by the direct-current power supply V1, the inductor L1, and the charging switching device T2, and energy is accumulated in the inductor L1. When the charging switching device T2 is switched from on to off, an induced electromotive force occurs in the inductor L1. Thus, as illustrated by using arrow A3, a current flows from the inductor L1 to the capacitor C1 and the capacitor C1 is charged. The power auxiliary circuit 13 in FIG. 2 is capable of charging the capacitor C1. Thus, the power auxiliary circuit 13 is capable of supplying power to the drive circuit 12. The power auxiliary circuit 13 in FIG. 2 may be also a charging circuit. The diode D1 is electrically connected between the inductor L1 and the capacitor C1. In particular, the anode of the diode D1 is electrically connected to the inductor L1, and the cathode of the diode D1 is electrically connected to the capacitor C1. The diode D1 reduces the possibility of unintentional discharge of the capacitor C1 through a current flowing from the capacitor C1 to the inductor L1.

The control circuit 14 controls the drive circuit 12 and the power auxiliary circuit 13. The control circuit 14 includes, for example, oscillators to output drive signals S1 and S2 described below. The control circuit 14 is, for example, an integrated circuit such as a FPGA (field-programmable gate array). The control circuit 14 controls switching of the drive switching device T1 of the drive circuit 12 so that a series of acoustic waves P1 are generated from the acoustic-wave source 11. At the same time, the control circuit 14 controls the power auxiliary circuit 13 so that power is supplied to the drive circuit 12 so as to avoid a decrease of power supplied to the acoustic-wave source 11.

The control circuit 14 controls switching (on/off) of the drive switching device T1 of the drive circuit 12. By controlling the drive switching device T1 of the drive circuit 12, the control circuit 14 performs an operation of generating a series of acoustic waves P1 from the acoustic-wave source 11. As illustrated in FIG. 1, the control circuit 14 outputs the drive signal S1 to control switching of the drive switching device T1. In the present preferred embodiment, the drive switching device T1 is a MOSFET and the drive signal S1 is input to the gate of the drive switching device T1. While the drive signal S1 is at the high level, the drive switching device T1 is ON. While the drive signal S1 is at the low level, the drive switching device T1 is OFF. FIG. 2 illustrates the drive signal S1 as a direct-current power supply.

The control circuit 14 controls switching (on/off) of the charging switching device T2 of the power auxiliary circuit 13. By controlling the charging switching device T2 of the power auxiliary circuit 13, the control circuit 14 performs an operation of supplying power to the drive circuit 12 so as to avoid a decrease of power supplied to the acoustic-wave source 11. As illustrated in FIG. 1, the control circuit 14 outputs the drive signal S2 to control switching of the charging switching device T2. In the present preferred embodiment, the charging switching device T2 is a MOSFET and the drive signal S2 is input to the gate of the charging switching device T2. While the drive signal S2 is at the high level, the charging switching device T2 is ON. While the drive signal S2 is at the low level, the charging switching device T2 is OFF. FIG. 2 illustrates the drive signal S2 as a direct-current power supply.

Figure 3:
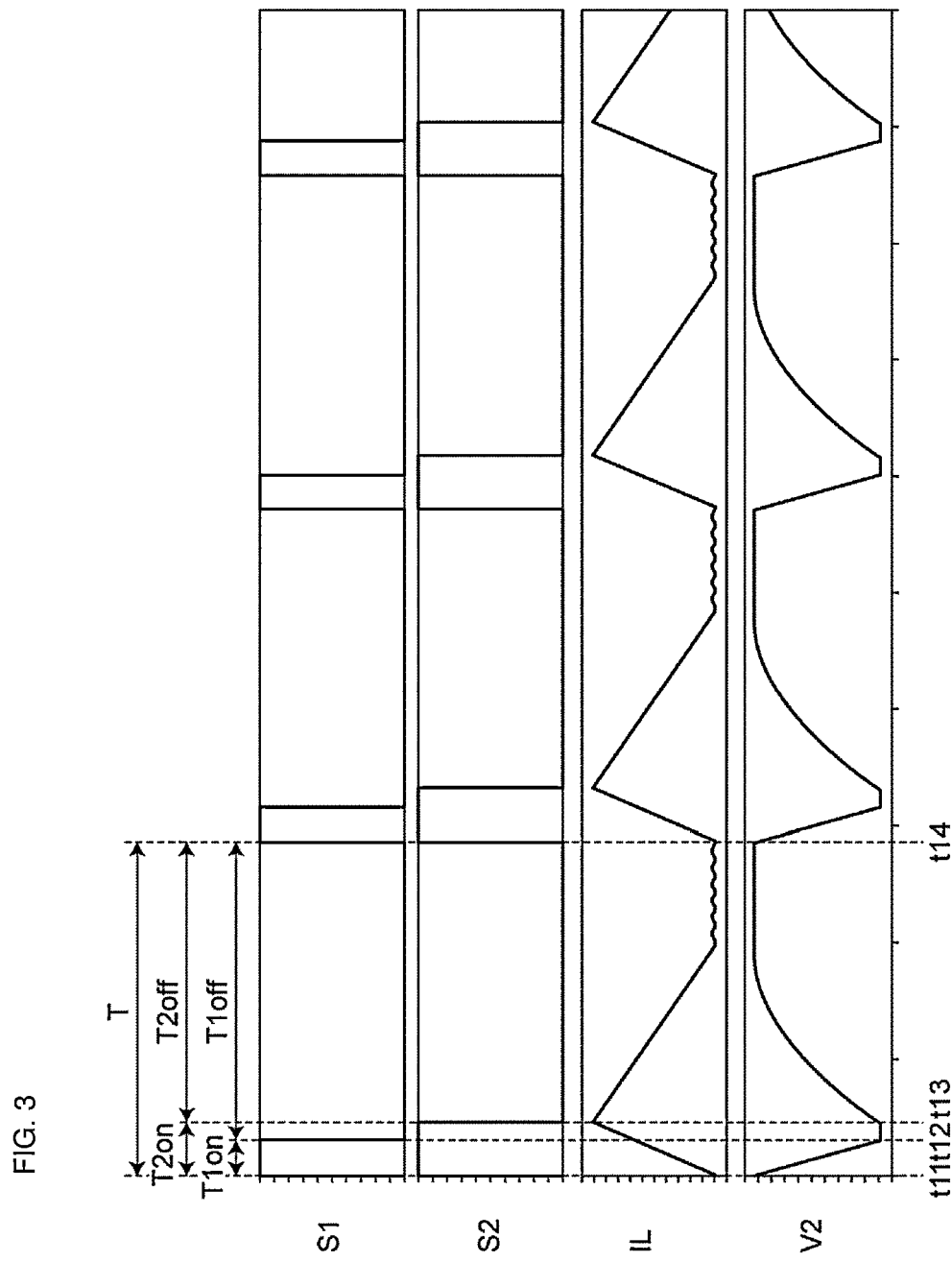
FIG. 3 is a timing chart for describing operations of the acoustic-wave generating device in FIG. 1.

Control of the drive circuit 12 and the power auxiliary circuit 13 by the control circuit 14 will be described in detail by referring to FIG. 3. FIG. 3 is a timing chart for describing operations of the acoustic-wave generating device 10.

The control circuit 14 outputs the drive signal S1 to the drive switching device T1 in order to control the drive circuit 12 so that a series of acoustic waves P1 are generated from the acoustic-wave source 11. The switching frequency of the drive switching device T1 corresponds to the frequency of a series of acoustic waves P1. The switching frequency of the drive switching device T1 is, for example, greater than or equal to about 20 kHz. The switching frequency of the drive switching device T1 is, for example, less than or equal to about 150 kHz. As illustrated in FIG. 3, the drive signal S1 is a pulse train signal. The cycle T of the pulse train of the drive signal S1 is set in accordance with the target switching frequency of the drive switching device T1. In FIG. 3, the cycle T of the drive signal S1 is constant or substantially constant. The length of the drive signal S1 may be, for example, from about 5 ms to about 30 ms. The pulse width of the drive signal S1 is set in accordance with the target duty ratio of the drive switching device T1. The cycle T in FIG. 3 includes the ON period T1on and the OFF period T1off of the drive switching device T1. The ON period T1on is a period during which the drive switching device T1 is ON. During the ON period T1on, a current flows from the capacitor C1 to the acoustic-wave source 11 and power is supplied to the acoustic-wave source 11. In FIG. 3, the voltage V2 of the capacitor C1 decreases during the ON period T1on. The OFF period T1off is a period during which the drive switching device T1 is OFF. During the OFF period T1off, no current flows from the capacitor C1 to the acoustic-wave source 11 and no power is supplied to the acoustic-wave source 11.

As illustrated in FIG. 3, the ON period T1on leads to a decrease of the voltage V2 of the capacitor C1. If the voltage V2 of the capacitor C1 remains at a low level, the acoustic-wave source 11 fails to be supplied with sufficient power in the next ON period T1on, resulting in failure of acquisition of a desired sound pressure of an acoustic wave P1. Therefore, the control circuit 14 charges the capacitor C1 by using the power auxiliary circuit 13 to resolve a decrease of the voltage V2 of the capacitor C1, that is, a reduction of the charge amount of the capacitor C1, due to the ON period T1on. The control circuit 14 outputs the drive signal S2 to the charging switching device T2 in order to control the power auxiliary circuit 13 so that the capacitor C1 is charged. As illustrated in FIG. 3, the drive signal S2 is a pulse train signal having the cycle T. In particular, the drive signal S2 is a pulse train signal having the same cycle (in this example, T) as that of the corresponding drive signal S1. In FIG. 3, the cycle T is constant. The pulse width is set in accordance with the target duty ratio of the charging switching device T2. The cycle T of the drive signal S2 in FIG. 3 includes the ON period T2on and the OFF period T2off of the charging switching device T2. The ON period T2on is a period during which the charging switching device T2 is ON. During the ON period T2on, a current flows from the direct-current power supply V1 to the inductor L1 and energy is accumulated in the inductor L1. The OFF period T2off is a period during which the charging switching device T2 is OFF. During the OFF period T2off, a current flows from the inductor L1 to the capacitor C1 and the capacitor C1 is charged. In the example in FIG. 3, the voltage V2 of the capacitor C1 increases from time t13, and, at time t14 when the cycle T ends, reaches the same value as that at time t11 at which the cycle T starts.

As illustrated in FIG. 3, the control circuit 14 outputs the drive signal S2 so that the power auxiliary circuit 13 supplies power to the drive circuit 12 in the OFF period T1off of the drive switching device T1. Thus, power is supplied for every occurrence of an acoustic wave P1, achieving stabilization of the sound pressure of a series of acoustic waves P1. In addition, a power change may be prevented during supply of power to the acoustic-wave source 11, achieving stabilization of the sound pressure of a series of acoustic waves P1. In particular, the control circuit 14 outputs the drive signal S2 so that the power auxiliary circuit 13 charges the capacitor C1 in the OFF period T1off of the drive switching device T1. Thus, the capacitor C1 of the drive circuit 12 is used as a destination of supply of power from the power auxiliary circuit 13, achieving stabilization of the sound pressure of a series of acoustic waves P1. Specifically, as illustrated in FIG. 3, the ON period T1on of the drive switching device T1 is set to the period from time t11 to time t12. The OFF period T1off of the drive switching device T1 is set to the period from time t12 to time t14. The ON period T2on of the charging switching device T2 is set to the period from time t11 to time t13, which is later than time t12. Thus, the charging switching device T2 is ON during the ON period T1on of the drive switching device T1, and is switched off in the OFF period T1off of the drive switching device T1. This achieves an increase of energy accumulated in the inductor L1. In the example in FIG. 3, the drive switching device T1 and the charging switching device T2 are switched on simultaneously (see time t11). This achieves simplification of control over the drive switching device T1 and the charging switching device T2. In the example in FIG. 3, the charging switching device T2 is switched off after the drive switching device T1 is switched off. This achieves an increase of energy accumulated in the inductor L1.

As illustrated in FIG. 2, the acoustic-wave generating device 10 causes the charging switching device T2 to be ON while the capacitor C1 supplies charge to the acoustic-wave source 11, and switches off the charging switching device T2 between pulses of the drive signal S1 for the acoustic-wave source 11. Thus, the acoustic-wave generating device 10 accumulates energy in the inductor L1 for the time during which the acoustic-wave source 11 is driven, and charges the capacitor C1 with the energy in the inductor L1 after end of driving of the acoustic-wave source 11. This allows the capacitor C1 to be charged for each acoustic wave P1. Therefore, even when a series of acoustic waves P1 are output from the acoustic-wave source 11, the series of acoustic waves P1 may be generated at a stable sound pressure without a decrease of the voltage of the capacitor C1.

In the acoustic-wave generating device 10, the power auxiliary circuit 13 is used to supply power to the drive circuit 12 so that power supplied to the acoustic-wave source 11 does not decrease in an operation of generating a series of acoustic waves P1 from the acoustic-wave source 11 through switching of the drive switching device T1. "Not decreasing" encompasses, not only not decreasing at all, but also substantially not decreasing, that is, a decrease that may be ignored as a whole. In the acoustic-wave generating device 10 according to the present preferred embodiment, the power auxiliary circuit 13 supplies power to the drive circuit 12 so that power supplied to the acoustic-wave source 11 is greater than or equal to a predetermined value. This supply of power is performed in order to avoid a decrease of power, which is supplied to the acoustic-wave source 11, in an operation of generating a series of acoustic waves P1 from the acoustic-wave source 11 through switching of the drive switching device T1. In the present preferred embodiment, when the voltage V2 of the capacitor C1 is equal or substantially equal to the voltage value Vc in the stationary state, the predetermined value corresponds to the magnitude of power supplied to the acoustic-wave source 11 during the ON period T1on. That is, "Power is supplied to the drive circuit 12 so that power supplied to the acoustic-wave source 11 is greater than or equal to the predetermined value" indicates that the drive circuit 12 is supplied with power greater than or equal to the power that has been consumed by the acoustic-wave source 11 due to occurrence of an acoustic wave P1. In the present preferred embodiment, this indicates that the capacitor C1 is supplied with energy greater than or equal to the energy consumed in the capacitor C1 due to occurrence of an acoustic wave P1.

In particular, the acoustic-wave generating device 10 is set so that the capacitor C1 receives, from the inductor L1, energy, whose magnitude is equal or substantially equal to that of the energy consumed in the capacitor C1 by the acoustic-wave source 11, every time the acoustic-wave source 11 outputs an acoustic wave P1. That is, the acoustic-wave generating device 10 is set so that the amount of energy discharged from the capacitor C1 matches the amount of energy accumulated in the inductor L1. An example of such a setting will be described below.

For example, assuming that the voltage value across the ends of the capacitor C1 in the stationary state is represented by Vc, the resistance value of the acoustic-wave source 11 is represented by Rth, the length of the ON period T1on of the drive switching device T1 is represented by tAon, the maximum of a current IL, which is output from the inductor L1 in the OFF period T2off of the charging switching device T2, is represented by imax, the self-inductance of the inductor L1 is represented by L. When the amount of energy discharged from the capacitor C1 matches the amount of energy accumulated in the inductor L1, the following expression is satisfied.

$$tAon \times \frac{Vc^2}{Rth} = \frac{1}{2} \times L \times imax^2 \qquad \text{Expression 1}$$

When imax, Vc, Rth, and tAon have been determined, L is set so that the following expression is satisfied. Thus, the sound pressure of a series of acoustic waves P1 may be stabilized.

$$L = \frac{2 \times Vc^2 \times tAon}{Rth \times imax^2} \qquad \text{Expression 2}$$

If a direct-current power supply having a large current capability is used as the direct-current power supply V1, the charging rate of the capacitor C1 may be improved and a reduction of the sound pressure may be decreased. However, a direct-current power supply having a large current capability is typically large and expensive. In particular, as the number of a series of acoustic waves P1 increases, the current capability of the direct-current power supply needs to be high and the current capability has a limit. In particular, in the acoustic-wave generating device 10 in the present preferred embodiment, the power auxiliary circuit 13 may make up for power for occurrence of an acoustic wave P1. Thus, a direct-current power supply having a large current capability does not need to be used as the direct-current power supply V1. For example, the voltage value of the direct-current power supply V1 is represented by V. The length of the ON period T2on of the charging switching device T2 is represented by tBon. The maximum of the current IL, which is output from the inductor L1 in the OFF period T2off of the charging switching device T2, is represented by imax. The self-inductance of the inductor L1 is represented by L. In this case, the direct-current power supply V1 may be set so that the following expression is satisfied. This achieves a reduction in size of the direct-current power supply V1.

$$i\max = \frac{V \times tBon}{L} \qquad \text{Expression 3}$$

Figure 4:
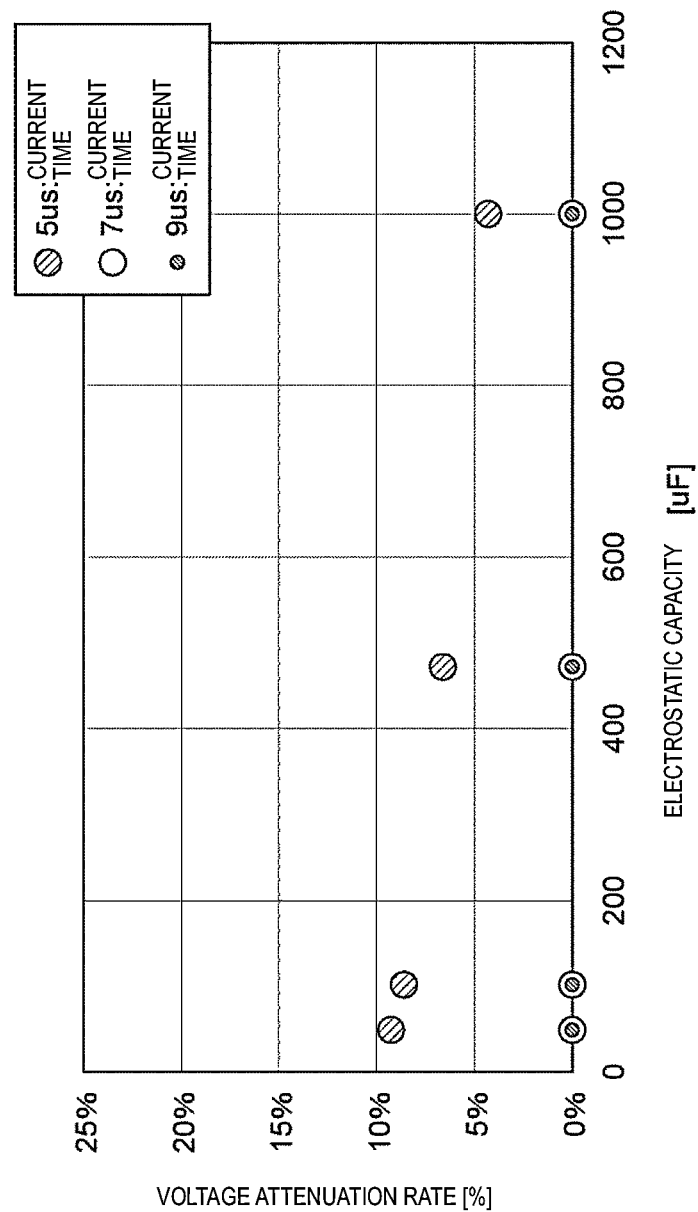
FIG. 4 is a graph of simulation results of voltage attenuation rate with respect to the electrostatic capacity of a capacitor.

If a capacitor having a large electrostatic capacity is used as the capacitor C1, sufficient energy may be stored and a reduction of the sound pressure may be decreased. However, a capacitor having a large electrostatic capacity is typically large and expensive. In particular, as the number of a series of acoustic waves P1 increases, a capacitor having a larger electrostatic capacity needs to be used and the electrostatic capacity has a limit. In contrast, as described above, a current flows from the direct-current power supply V1 during the ON period T2on of the charging switching device T2 and energy is accumulated in the inductor L1. If the length tBon of the ON period T2on of the charging switching device T2, that is, the time (current time) during which a current flows from the direct-current power supply V1 to the inductor L1, is made long, energy supplied to the capacitor C1 may be increased. FIG. 4 is a graph illustrating simulation results of voltage attenuation rate ([%]) with respect to the electrostatic capacity ([μF]) of the capacitor C1 with the current time being changed. The voltage attenuation rate indicates, for example, a rate of the voltage V2 value decreased in a single cycle T with respect to the value Vc of the voltage V2 of the capacitor C1 in the stationary state. As is clear from FIG. 4, as the electrostatic capacity increases, the voltage attenuation rate tends to be less. The voltage attenuation rate depends on the current time by a large extent. In FIG. 4, when the current time is greater than or equal to about 7 is, even if the electrostatic capacity is less than or equal to about 100 μF, the voltage attenuation rate is about 0%. Therefore, through setting of the current time, a voltage attenuation rate of about 0% may be obtained regardless of the electrostatic capacity of the capacitor C1, achieving a reduction in size of the capacitor C1.

1-2-2. Wave Receiving Device

The wave receiving device 20 receives acoustic waves and outputs, to the processing circuit 30, received-wave signals indicating the received acoustic waves. The wave receiving device 20 in FIG. 1 includes multiple (two, in the illustrated example) microphones 21, multiple (two, in the illustrated example) amplifier circuits 22, multiple (two, in the illustrated example) filters 23, an AD converter 24, and a control circuit 25.

The microphones 21 are electro-acoustic transducer elements which convert acoustic waves to electric signals. When the microphones 21 receive acoustic waves, the microphones 21 output analog received-wave signals indicating the received acoustic waves. The microphones 21 are used to detect acoustic waves P1, which have been reflected from an object after output from the acoustic-wave source 11. The amplifier circuits 22 amplify, for output, the analog received-wave signals from the microphones 21. The filters 23 pass signals in a passband including the frequency band of the acoustic waves P1. The filters 23 are, for example, band pass filters. The AD converter 24 performs conversion into digital received-wave signals indicating the analog received-wave signals, which have passed through the filters 23, and outputs the resulting signals to the control circuit 25. The microphones 21, the amplifier circuits 22, the filters 23, and the AD converter 24 may have known configurations of the related art, and will not be described in detail.

The control circuit 25 controls the AD converter 24 so that the AD converter 24 outputs the digital received-wave signals to the control circuit 25. The control circuit 25 outputs, to the processing circuit 30, the digital received-wave signals from the AD converter 24. The control circuit 25 is, for example, an integrated circuit such as an FPGA. The control circuit 14 and the control circuit 25 may be integrated into a single chip. For example, the control circuit 14 and the control circuit 25 may be provided as a single FPGA.

1-2-3. Processing Circuit

The processing circuit 30 is a circuit which controls operations of the object detection system 1. The processing circuit 30 may be provided, for example, by using a computer system including one or more processors (microprocessors) and one or more memories. One or more processors execute programs to provide the functions of the processing circuit 30.

The processing circuit 30 performs an object detection process to detect an object in a target space by using acoustic waves P1 from the acoustic-wave generating device 10. The object detection process includes a wave transmission process and a determination process. The wave transmission process controls the acoustic-wave generating device 10 so that the acoustic-wave generating device 10 generates acoustic waves P1. The wave transmission process causes the acoustic-wave generating device 10 to output a series of acoustic waves P1, for example, by transmitting a measurement start signal to the acoustic-wave generating device 10. The determination process obtains received-wave signals, indicating acoustic waves received by the wave receiving device 20, from the wave receiving device 20 which receives acoustic waves from the target space. The determination process obtains, for example, digital received-wave signals from the wave receiving device 20. The determination process determines whether an object is present in the target space based on the obtained received-wave signals. For example, if the peak value of the cross-correlation function between the wave transmission signal, indicating a series of acoustic waves P1, and the received-wave signals is greater than or equal to a threshold, the determination process determines that an object is present in the target space. As the peak of the cross-correlation function, for example, the main lobe of the cross-correlation function is used. If it is determined that an object is present in the target space, the determination process determines the distance to the object based on the received-wave signals. For example, the determination process obtains the distance to the object by using the TOF (Time of Flight) technique based on the time at which the peak of the cross-correlation function between the wave transmission signal and the received-wave signals appears. A known technique of the related art may be used, for example, to detect an object and measure the distance to the object by using acoustic waves, and detailed description will be avoided.

The processing circuit 30 has functions of setting the drive signals S1 and S2 of the control circuit 14 of the acoustic-wave generating device 10.

1-3. Evaluation of Performance

Figure 5:
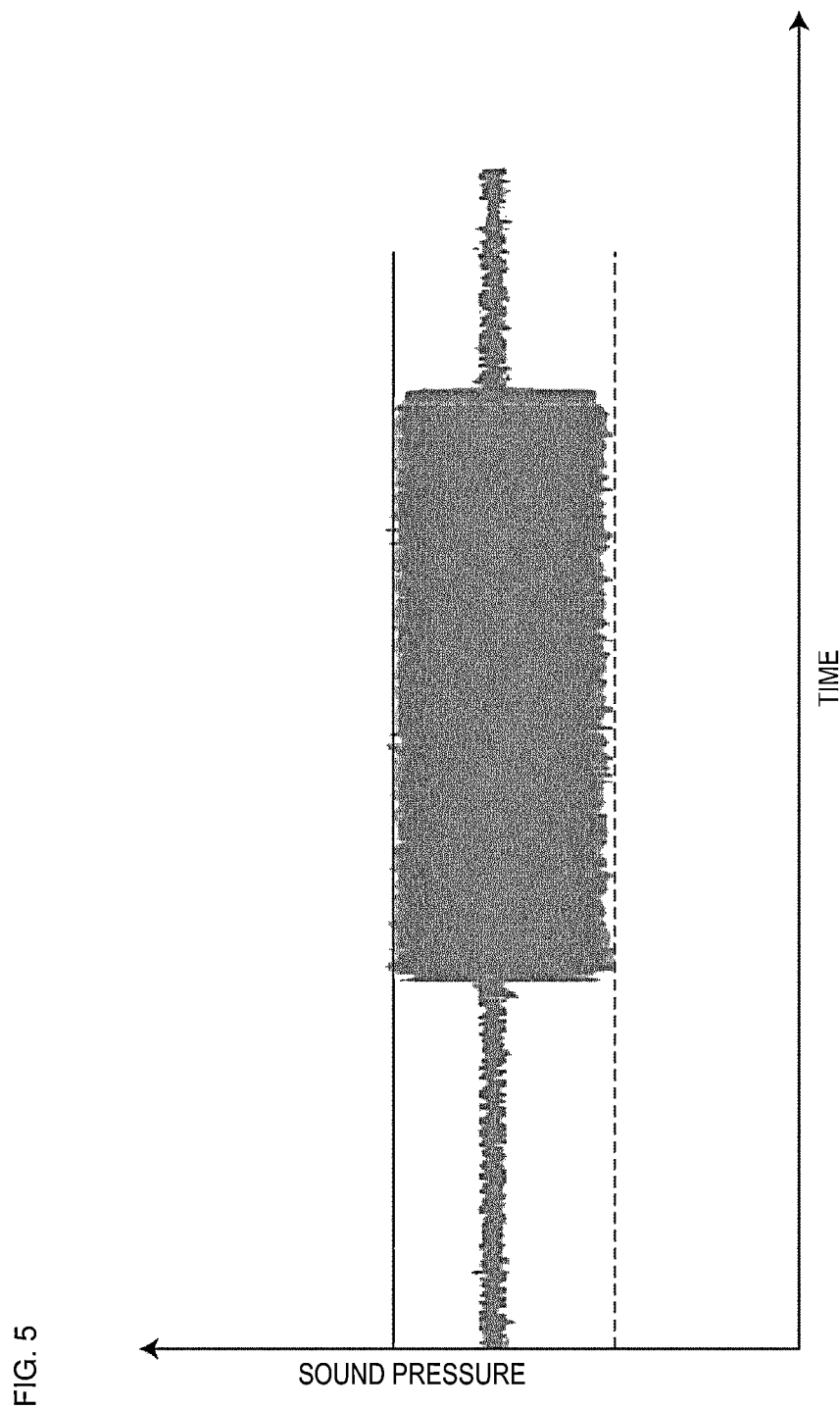
FIG. 5 is a graph of a measurement result of the sound pressure of a series of acoustic waves which are output from the acoustic-wave generating device in FIG. 1.
Figure 6:
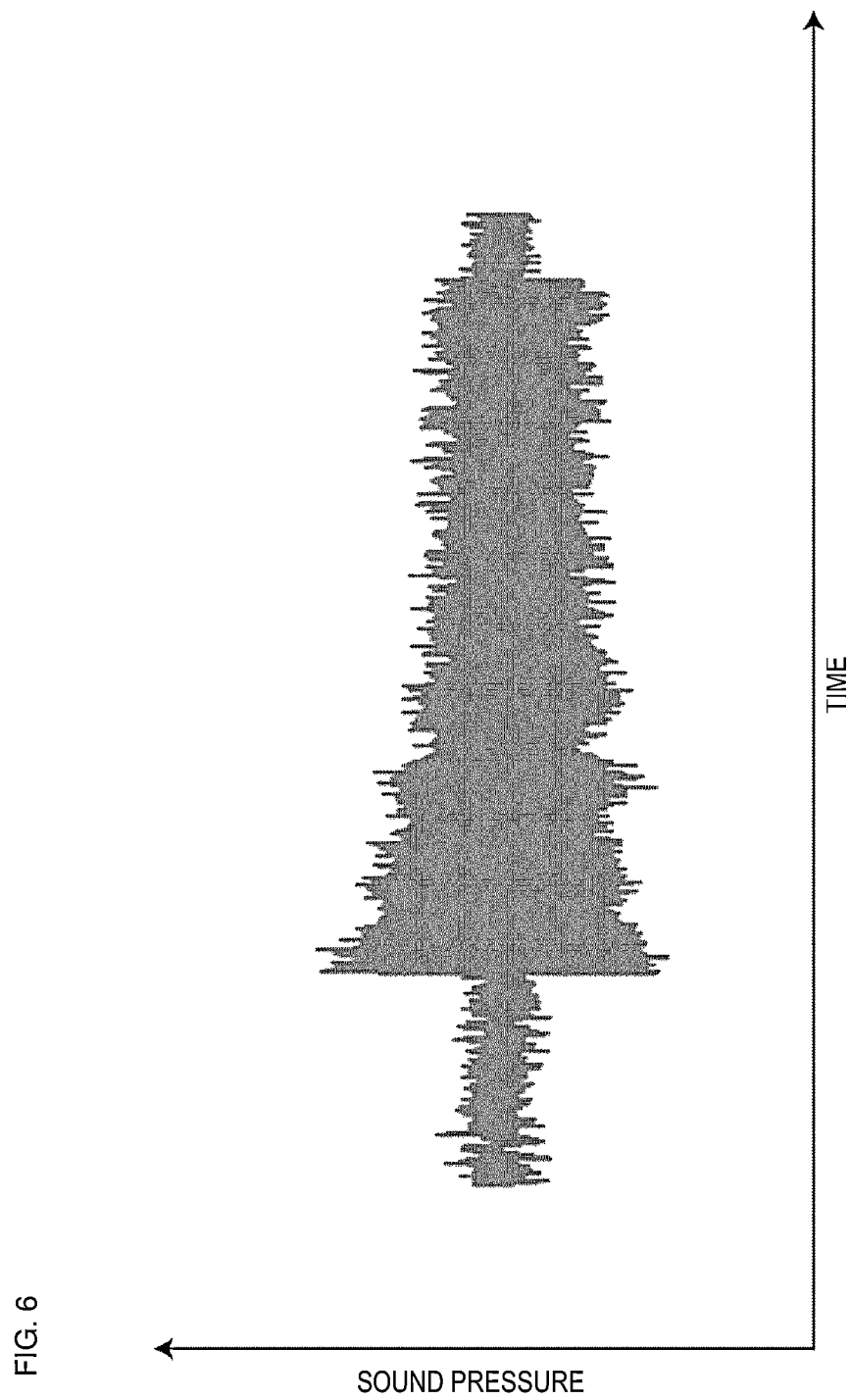
FIG. 6 is a graph of a measurement result of the sound pressure of a series of acoustic waves which are output from an acoustic-wave generating device according to a comparative example.

To confirm the acoustic-wave generating device 10's effect of stabilization of the sound pressure of a series of acoustic waves P1, the sound pressure of a series of acoustic waves P1, which are output from the acoustic-wave generating device 10, was measured. As a comparative example, the sound pressure of a series of acoustic waves, which are output from an acoustic-wave generating device which does not include the power auxiliary circuit 13, was measured. FIG. 5 is a graph illustrating the measurement result of the sound pressure of a series of acoustic waves P1 which are output from the acoustic-wave generating device 10. FIG. 6 is a graph illustrating the measurement result of the sound pressure of a series of acoustic waves which are output from the acoustic-wave generating device according to the comparative example.

As illustrated in FIG. 6, in the acoustic-wave generating device according to the comparative example, the envelope of the sound pressure of a series of acoustic waves decreases with time. This may be because, in the acoustic-wave generating device according to the comparative example, charging of the capacitor C1 in the OFF period T1off of the drive switching device T1 is insufficient in an operation of outputting a series of acoustic waves from the acoustic-wave source 11 through switching of the drive switching device T1. Insufficient charging of the capacitor C1 causes a decrease of the charge amount stored in the capacitor C1 and a decrease of power supplied to the acoustic-wave source 11. A decrease of power supplied to the acoustic-wave source 11 contributes to a reduction of the sound pressure of acoustic waves, resulting in destabilization of the sound pressure.

In contrast, as illustrated in FIG. 5, in the acoustic-wave generating device 10, the envelope of the sound pressure of a series of acoustic waves P1 does not decrease. This is because, as described above, the acoustic-wave generating device 10, which includes the power auxiliary circuit 13, may supply sufficient power to the acoustic-wave source 11 also in an operation of generating a series of acoustic waves P1 from the acoustic-wave source 11 through switching of the drive switching device T1. Thus, the acoustic-wave generating device 10 may output a series of acoustic waves P1 from the acoustic-wave source 11 with suppression of a reduction of the sound pressure.

As is clear from FIGS. 5 and 6, the acoustic-wave generating device 10 according to the present preferred embodiment achieves stabilization of the sound pressure of a series of acoustic waves P1.

1-4. Advantageous Effects and the Like

The acoustic-wave generating device 10 described above includes the drive circuit 12 and the power auxiliary circuit 13. The drive circuit 12 includes the capacitor C1, which is charged by using the direct-current power supply V1, and the drive switching device T1, which causes power to be supplied from the capacitor C1 to the acoustic-wave source 11 which produces heat through energization to generate an acoustic wave P1. The power auxiliary circuit 13 supplies power to the drive circuit 12 so as to avoid a decrease of power supplied to the acoustic-wave source 11 in an operation of generating a series of acoustic waves P1 from the acoustic-wave source 11 through switching of the drive switching device T1. That is, for every occurrence of an acoustic wave P1, the power auxiliary circuit 13 supplies the drive circuit 12 with power greater than or equal to the power consumed to generate an acoustic wave P1. This configuration achieves stabilization of the sound pressure of a series of acoustic waves P1.

In the acoustic-wave generating device 10, the power auxiliary circuit 13 supplies power to the drive circuit 12 in the OFF period T1off of the drive switching device T1. This configuration enables supply of power for every occurrence of an acoustic wave P1, achieving stabilization of the sound pressure of a series of acoustic waves P1.

In the acoustic-wave generating device 10, the power auxiliary circuit 13 charges the capacitor C1 in the OFF period T1off of the drive switching device T1. In this configuration, the capacitor C1 of the drive circuit 12 is used as the destination of supply of power from the power auxiliary circuit 13, achieving stabilization of the sound pressure of a series of acoustic waves P1.

In the acoustic-wave generating device 10, the power auxiliary circuit 13 includes the inductor L1, which is electrically connected between the direct-current power supply V1 and the capacitor C1, and the charging switching device T2, which is electrically connected in parallel to the series circuit of the inductor L1 and the direct-current power supply V1. This configuration achieves simplification of the circuit configuration.

In the acoustic-wave generating device 10, the power auxiliary circuit 13 includes the diode D1. The diode D1 is electrically connected, at its anode, to the inductor L1, and is electrically connected, at its cathode, to the capacitor C1. This configuration enables a reduction of the possibility of unintentional discharge of the capacitor C1 through a current flowing from the capacitor C1 to the inductor L1.

In the acoustic-wave generating device 10, the charging switching device T2 is ON during the ON period T1on of the drive switching device T1, and is switched off in the OFF period T1off of the drive switching device T1. This configuration achieves an increase of energy accumulated in the inductor L1.

In the acoustic-wave generating device 10, the drive switching device T1 and the charging switching device T2 are switched on simultaneously. This configuration achieves simplification of control over the drive switching device T1 and the charging switching device T2.

In the acoustic-wave generating device 10, the charging switching device T2 is switched off after the drive switching device T1 is switched off. This configuration achieves an increase of energy accumulated in the inductor L1.

In the acoustic-wave generating device 10, the voltage value across the ends of the capacitor C1 in the stationary state is represented by Vc, the resistance value of the acoustic-wave source 11 is represented by Rth, the length of the ON period of the drive switching device T1 is represented by tAon, the maximum of the current IL, which is output from the inductor L1 in the OFF period T2off of the charging switching device T2, is represented by imax, the self-inductance of the inductor L1 is represented by L. L satisfies the following expression.

$$L = \frac{2 \times Vc^2 \times tAon}{Rth \times imax^2} \qquad \text{Expression 4}$$

This configuration achieves stabilization of the sound pressure of a series of acoustic waves P1.

In the acoustic-wave generating device 10, the voltage value of the direct-current power supply V1 is represented by V, the length of the ON period T2on of the charging switching device T2 is represented by tBon, the maximum of the current IL, which is output from the inductor L1 in the OFF period T2off of the charging switching device T2, is represented by imax, the self-inductance of the inductor L1 is represented by L. The direct-current power supply V1 and the inductor L1 are set so that the following expression is satisfied.

$$imax = \frac{V \times tBon}{L} \qquad \text{Expression 5}$$

This configuration achieves stabilization of the sound pressure of a series of acoustic waves P1.

In the acoustic-wave generating device 10, the drive circuit 12 includes the overcurrent protective element (resistor R1) which is electrically connected between the capacitor C1 and the direct-current power supply V1. This configuration achieves prevention of excessive heating of the acoustic-wave source 11.

In the acoustic-wave generating device 10, the switching frequency of the drive switching device T1 is greater than or equal to about 20 kHz. This configuration achieves stabilization of the sound pressure of a series of acoustic waves P1.

The acoustic-wave generating device 10 includes the control circuit 14 which controls the drive circuit 12 and the power auxiliary circuit 13. The control circuit 14 controls switching of the drive switching device T1 of the drive circuit 12 so that a series of acoustic waves P1 are generated from the acoustic-wave source 11. At the same time, the control circuit 14 controls the power auxiliary circuit 13 so that power is supplied to the drive circuit 12 so as to avoid a decrease of power supplied to the acoustic-wave source 11. This configuration achieves stabilization of the sound pressure of a series of acoustic waves P1.

The acoustic-wave generating device 10 includes the drive circuit 12 and the power auxiliary circuit 13. The drive circuit 12 includes the capacitor C1, which is charged by using the direct-current power supply V1, and the drive switching device T1, which causes power to be supplied from the capacitor C1 to the acoustic-wave source 11 which produces heat through energization to generate an acoustic wave P1. The power auxiliary circuit 13 includes the inductor L1, which is electrically connected between the direct-current power supply V1 and the capacitor C1, and the charging switching device T2, which is electrically connected in parallel to the series circuit of the inductor L1 and the direct-current power supply V1. The power auxiliary circuit 13 supplies power to the drive circuit 12 in the OFF period T1off of the drive switching device T1 in an operation of generating a series of acoustic waves P1 from the acoustic-wave source 11 through switching of the drive switching device T1. This configuration enables the power auxiliary circuit 13 to supply, for every occurrence of an acoustic wave P1, the drive circuit 12 with power greater than or equal to the power consumed to generate an acoustic wave P1 in an operation of generating a series of acoustic waves P1 from the acoustic-wave source 11 through switching of the drive switching device T1. Therefore, stabilization of the sound pressure of a series of acoustic waves P1 is achieved.

2. Second Preferred Embodiment 2-1. Configuration

Figure 7:
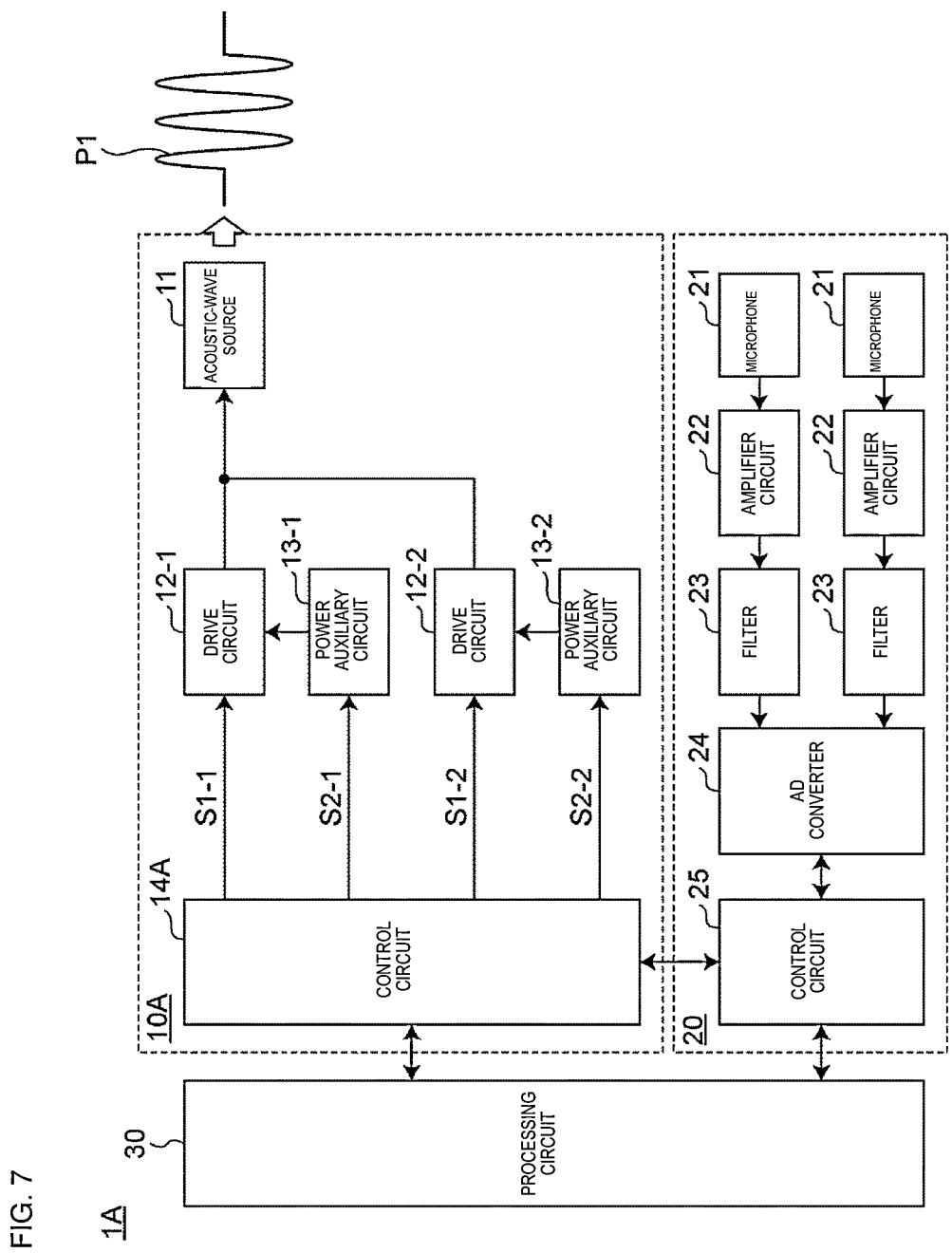
FIG. 7 is a block diagram illustrating an exemplary configuration of an object detection system including an acoustic-wave generating device according to a second preferred embodiment of the present invention.

FIG. 7 is a block diagram illustrating an exemplary configuration of an object detection system 1A including an acoustic-wave generating device 10A according to a second preferred embodiment of the present invention. As illustrated in FIG. 7, the object detection system 1A includes the acoustic-wave generating device 10A, the wave receiving device 20, and the processing circuit 30.

Figure 8:
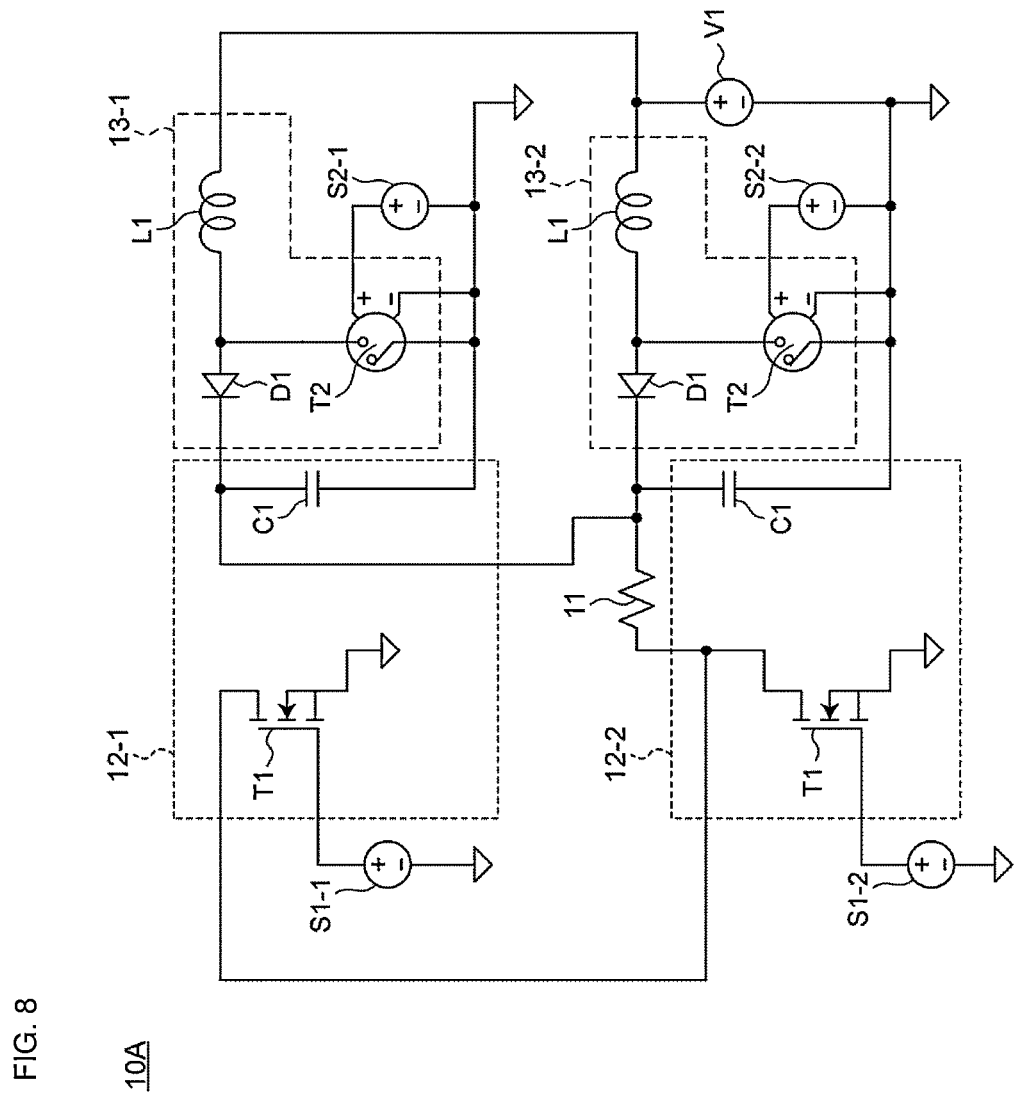
FIG. 8 is a circuit diagram illustrating an exemplary configuration of the acoustic-wave generating device in FIG. 7.

FIG. 8 is a circuit diagram illustrating an exemplary configuration of the acoustic-wave generating device 10A. As illustrated in FIGS. 7 and 8, the acoustic-wave generating device 10A includes the acoustic-wave source 11, multiple (two, in the illustrated example) drive circuits 12-1 and 12-2 (hereinafter collectively designated with reference numeral 12), multiple (two, in the illustrated example) power auxiliary circuits 13-1 and 13-2 (hereinafter collectively designated with reference numeral 13), and a control circuit 14A. In FIG. 8, the control circuit 14A is not illustrated.

As illustrated in FIG. 8, each of the drive circuits 12-1 and 12-2 includes a capacitor C1 and a drive switching device T1. The capacitors C1 are electrically connected between the ground and the respective connection points between the direct-current power supply V1 and the acoustic-wave source 11. The capacitors C1 are charged by using the direct-current power supply V1. The capacitors C1 of the drive circuits 12-1 and 12-2 are electrically connected in parallel to each other. The drive switching devices T1 are electrically connected between the acoustic-wave source 11 and the ground. The drive switching devices T1 of the drive circuits 12-1 and 12-2 are electrically connected in parallel to each other.

As illustrated in FIGS. 7 and 8, the power auxiliary circuits 13-1 and 13-2 correspond to the drive circuits 12-1 and 12-2, respectively. As illustrated in FIG. 8, each of the power auxiliary circuits 13-1 and 13-2 includes an inductor L1, a charging switching device T2, and a diode D1. The inductors L1 are electrically connected between the direct-current power supply V1 and the respective capacitors C1. The inductors L1 of the power auxiliary circuits 13-1 and 13-2 are electrically connected in parallel to each other. In each power auxiliary circuit 13, the charging switching device T2 is electrically connected in parallel to the series circuit of the inductor L1 and the direct-current power supply V1. The inductors L1, the direct-current power supply V1, and the charging switching devices T2 define closed loops. The diode D1 of the power auxiliary circuit 13-1 is electrically connected between the inductor L1 of the power auxiliary circuit 13-1 and the capacitor C1 of the drive circuit 12-1 corresponding to the power auxiliary circuit 13-1. The diode D1 of the power auxiliary circuit 13-2 is electrically connected between the inductor L1 of the power auxiliary circuit 13-2 and the capacitor C1 of the drive circuit 12-2 corresponding to the power auxiliary circuit 13-2.

The control circuit 14A controls the drive circuits 12-1 and 12-2 and the power auxiliary circuits 13-1 and 13-2. The control circuit 14 controls switching of the drive switching devices T1 of the drive circuits 12-1 and 12-2 so that a series of acoustic waves P1 are generated from the acoustic-wave source 11. At the same time, the control circuit 14 controls the power auxiliary circuits 13-1 and 13-2 so that power is supplied to the drive circuits 12-1 and 12-2 so as to avoid a decrease of power supplied to the acoustic-wave source 11. In particular, the control circuit 14A alternately uses the set of the drive circuit 12-1 and the power auxiliary circuit 13-1 and the set of the drive circuit 12-2 and the power auxiliary circuit 13-2.

The control circuit 14 outputs multiple drive signals S1-1 and S1-2 (hereinafter collectively designated with reference numeral S1) to control switching of the drive switching devices T1 of the drive circuits 12-1 and 12-2. In FIG. 8, the drive switching devices T1 are, for example, MOSFETs and the drive signals S1 are input to the gates of the drive switching devices T1. In FIG. 8, the drive signals S1-1 and S1-2 are illustrated as direct-current power supplies.

The control circuit 14 outputs multiple drive signals S2-1 and S2-2 (hereinafter collectively designated with reference numeral S2) to control switching of the charging switching devices T2 of the power auxiliary circuits 13-1 and 13-2. In FIG. 8, the charging switching devices T2 are, for example, MOSFETs and the drive signals S2 are input to the gates of the charging switching devices T2. In FIG. 8, the drive signals S2-1 and S2-2 are illustrated as direct-current power supplies.

Figure 9:
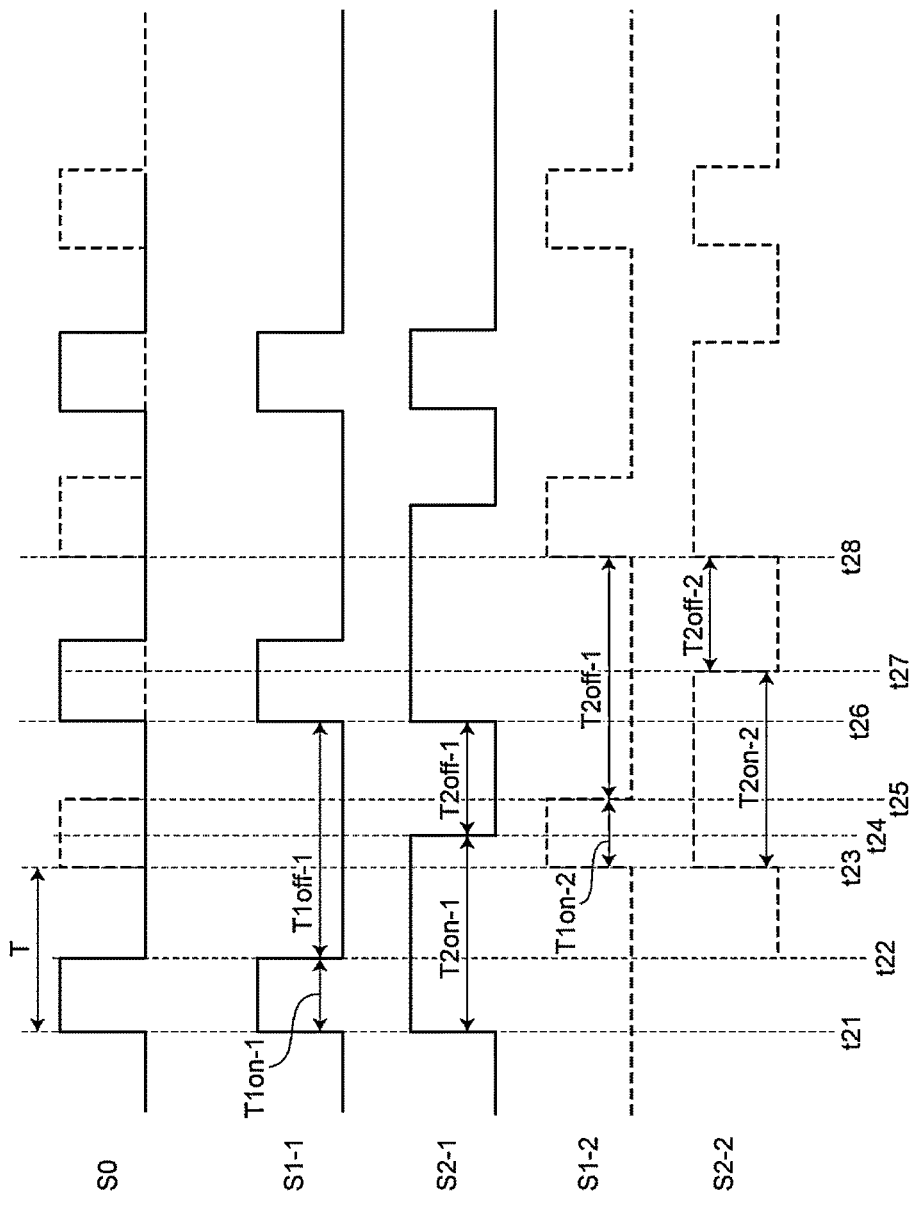
FIG. 9 is a timing chart for describing operations of the acoustic-wave generating device in FIG. 7.

The control circuit 14A's control of the drive circuit 12 and the power auxiliary circuit 13 will be described in detail by referring to FIG. 9. FIG. 9 is a timing chart for describing operations of the acoustic-wave generating device 10A.

The control circuit 14A outputs the drive signals S1-1 and S1-2 to the drive switching devices T1 of the drive circuits 12-1 and 12-2 in order to control the drive circuits 12 so that a series of acoustic waves P1 are generated from the acoustic-wave source 11. The drive signals S1-1 and S1-2 are set so that the drive switching devices T1 of the drive circuits 12-1 and 12-2 cooperate with each other to generate a series of acoustic waves P1 from the acoustic-wave source 11. In particular, the control circuit 14A sets the drive signals S1-1 and S1-2 so that the drive switching devices T1 of the drive circuits 12-1 and 12-2 are alternately switched to generate a series of acoustic waves P1 from the acoustic-wave source 11. In FIG. 9, S0 represents a combined drive signal obtained by combining the drive signals S1-1 and S1-2 with each other. The combined drive signal S0 is set so that the cycle and the length of the combined drive signal S0 correspond to those of a series of acoustic waves P1. As illustrated in FIG. 9, the combined drive signal S0 is a pulse train signal having the cycle T. The cycle T corresponds to the cycle of a series of acoustic waves P1. As described above, the combined drive signal S0 is obtained by combining the drive signals S1-1 and S1-2 with each other. In FIG. 9, each of the drive signals S1-1 and S1-2 is a pulse train having a cycle about twice that of the combined drive signal S0 (2T). The drive signal S1-1 is shifted with respect to the drive signal S1-2 by the cycle T of the combined drive signal S0. Thus, the combined drive signal S0 illustrated in FIG. 9 is obtained. The cycle of the drive signals S1 and the phase shift between the drive signals S1 may be appropriately set, and are not limited to the example in FIG. 9.

The cycle of the drive signal S1-1 includes the ON period T1on-1 and the OFF period T1off-1 of the drive switching device T1 of the drive circuit 12-1. During the ON period T1on-1, a current flows from the capacitor C1 of the drive circuit 12-1 to the acoustic-wave source 11 and power is supplied to the acoustic-wave source 11. During the OFF period T1off-1, no current flows from the capacitor C1 of the drive circuit 12-1 to the acoustic-wave source 11 and no power is supplied from the drive circuit 12-1 to the acoustic-wave source 11. The cycle of the drive signal S1-2 includes the ON period T1on-2 and the OFF period T1off-2 of the drive switching device T1 of the drive circuit 12-2. During the ON period T1on-2, a current flows from the capacitor C1 of the drive circuit 12-2 to the acoustic-wave source 11 and power is supplied to the acoustic-wave source 11. During the OFF period T1off-2, no current flows from the capacitor C1 of the drive circuit 12-2 to the acoustic-wave source 11 and no power is supplied from the drive circuit 12-2 to the acoustic-wave source 11.

The control circuit 14A supplies power to the acoustic-wave source 11 alternately from the capacitors C1 of the drive circuits 12-1 and 12-2.

The control circuit 14A causes the power auxiliary circuits 13-1 and 13-2 to charge the corresponding capacitors C1 in order to resolve decreases of the voltages V2 of the capacitors C1 of the drive circuits 12-1 and 12-2 due to the ON periods T1on-1 and T1on-2. To charge the capacitors C1 through control over the respective power auxiliary circuits 13-1 and 13-2, the control circuit 14A outputs the drive signals S2-1 and S2-2 to the charging switching devices T2 of the power auxiliary circuits 13-1 and 13-2. The control circuit 14A sets the drive signals S2-1 and S2-2 so that the power auxiliary circuits 13-1 and 13-2 supply power to the respective drive circuits 12 so as to avoid a decrease of power supplied to the acoustic-wave source 11 in an operation of generating a series of acoustic waves P1 from the acoustic-wave source 11 through alternate switching of the drive switching devices T1 of the drive circuits 12-1 and 12-2. Thus, in the OFF period T1off of the drive switching device T1 of each of the drive circuits 12 of the drive circuits 12-1 and 12-2, the corresponding one of the power auxiliary circuits 13-1 and 13-2 supplies power to the drive circuit 12 in an operation of generating a series of acoustic waves from the acoustic-wave source 11 through alternate switching of the drive switching devices T1 of the drive circuits 12-1 and 12-2.

As illustrated in FIG. 9, the drive signals S2-1 and S2-2 are pulse train signals having the same or substantially the same cycle (2T in this example) as that of the corresponding drive signals S1-1 and S1-2. The pulse widths are set in accordance with the target duty ratios of the charging switching devices T2. The cycle of the drive signal S2-1 includes the ON period T2on-1 and the OFF period T2off-1 of the charging switching device T2 of the power auxiliary circuit 13-1. During the ON period T2on-1, a current flows from the direct-current power supply V1 to the inductor L1 of the power auxiliary circuit 13-1 and energy is accumulated in the inductor L1 of the power auxiliary circuit 13-1. During the OFF period T2off-1, a current flows from the inductor L1 of the power auxiliary circuit 13-1 to the capacitor C1 of the drive circuit 12-1 and the capacitor C1 of the drive circuit 12-1 is charged. The cycle of the drive signal S2-2 includes the ON period T2on-2 and the OFF period T2off-2 of the charging switching device T2 of the power auxiliary circuit 13-2. During the ON period T2on-2, a current flows from the direct-current power supply V1 to the inductor L1 of the power auxiliary circuit 13-2 and energy is accumulated in the inductor L1 of the power auxiliary circuit 13-2. During the OFF period T2off-2, a current flows from the inductor L1 of the power auxiliary circuit 13-2 to the capacitor C1 of the drive circuit 12-2 and the capacitor C1 of the drive circuit 12-2 is charged.

As illustrated in FIG. 9, the control circuit 14A outputs the drive signals S2-1 and S2-2 so that the power auxiliary circuits 13-1 and 13-2 supply power to the drive circuits 12-1 and 12-2 in the OFF periods T1off-1 and T1off-2. Thus, power is supplied for every occurrence of an acoustic wave P1, achieving stabilization of the sound pressure. In addition, a change of power is prevented during supply of power to the acoustic-wave source 11, achieving stabilization of the sound pressure. The control circuit 14A outputs the drive signals S2-1 and S2-2 so that the power auxiliary circuits 13-1 and 13-2 charge the respective capacitors C1 of the drive circuits 12-1 and 12-2 in the OFF periods T1on-1 and T1on-2. Thus, the capacitors C1 of the drive circuits 12 are used as the destinations of supply of power from the respective power auxiliary circuits 13, achieving stabilization of the sound pressure.

Specifically, as illustrated in FIG. 9, the ON period T1on-1 is set to a period from time t21 to time t22, the OFF period T1off-1 is set to a period from time t22 to time t26. The ON period T2on-1 is set to a period from time t21 to time t24 which is later than time t22. Thus, the charging switching device T2 of the power auxiliary circuit 13-1 is ON during the ON period T1on-1, and is switched off in the OFF period T1off-1. This achieves an increase of energy accumulated in the inductor L1 of the power auxiliary circuit 13-1. In particular, the cycle 2T of the drive signal S1-1, which is longer than the cycle T of the combined drive signal S0, allows the ON period T2on-1 to be made longer than the cycle of the combined drive signal S0. This achieves a further increase of energy accumulated in the inductor L1 of the power auxiliary circuit 13-1.

As illustrated in FIG. 9, the ON period T1on-2 is set to a period from time t23 to time t25, the OFF period T1off-2 is set to a period from time t25 to time t28. The ON period T2on-2 is set to a period from time t23 to time t27 which is later than time t25. Thus, the charging switching device T2 of the power auxiliary circuit 13-2 is ON during the ON period T1on-2, and is switched off in the OFF period T1off-2. This achieves an increase of energy accumulated in the inductor L1 of the power auxiliary circuit 13-2. In particular, the cycle 2T of the drive signal S1-2, which is longer than the cycle T of the combined drive signal S0, allows the ON period T2on-2 to be made longer than the cycle of the combined drive signal S0. This achieves a further increase of energy accumulated in the inductor L1 of the power auxiliary circuit 13-2.

In the present preferred embodiment, the acoustic-wave generating device 10A performs an operation of generating a series of acoustic waves P1 from the acoustic-wave source 11 through alternate switching of the drive switching devices T1 of the drive circuits 12. In the present preferred embodiment, the acoustic-wave generating device 10A, which includes the two drive circuits 12-1 and 12-2, supplies power to the acoustic-wave source 11 alternately from the two drive circuits 12-1 and 12-2. In such an operation of generating a series of acoustic waves P1, the power auxiliary circuits 13 supply power to the respective drive circuits 12 so as to avoid a decrease of power supplied to the acoustic-wave source 11. In the present preferred embodiment, the power auxiliary circuit 13-1 supplies power to the drive circuit 12-1; the power auxiliary circuit 13-2, to the drive circuit 12-2.

Thus, in the present preferred embodiment, a series of acoustic waves P1 are generated from the acoustic-wave source 11 through alternate switching of the drive switching devices T1 of the drive circuits 12. Therefore, the ON period T2on of the charging switching device T2 of each power auxiliary circuit 13 may be made longer than the cycle of a series of acoustic waves P1. That is, providing multiple sets of a drive circuit 12 and a power auxiliary circuit 13 enables the ON period T2on of each charging switching device T2 to be made longer than the cycle of a series of acoustic waves P1, achieving more energy which may be accumulated in the inductor L1 during the ON period T2on of the charging switching device T2.

2-2. Advantageous Effects and the Like

The acoustic-wave generating device 10A described above includes the multiple drive circuits 12 and the multiple power auxiliary circuits 13 corresponding to the drive circuits 12. The power auxiliary circuits 13 supply power to the respective drive circuits 12 so as to avoid a decrease of power supplied to the acoustic-wave source 11 in an operation of generating a series of acoustic waves P1 from the acoustic-wave source 11 though alternate switching of the drive switching devices T1 of the drive circuits 12. This configuration achieves stabilization of the sound pressure of a series of acoustic waves P1.

In other words, the acoustic-wave generating device 10A includes the multiple drive circuits 12 and the multiple power auxiliary circuits 13 corresponding to the drive circuits 12. In the OFF period T1off of the drive switching device T1 of each drive circuit 12, the corresponding power auxiliary circuit 13 supplies power to the drive circuit 12 in an operation of generating a series of acoustic waves from the acoustic-wave source 11 through alternate switching of the drive switching devices T1 of the drive circuits 12. This configuration achieves stabilization of the sound pressure of a series of acoustic waves P1.

3. Third Preferred Embodiment 3-1. Configuration

Figure 10:
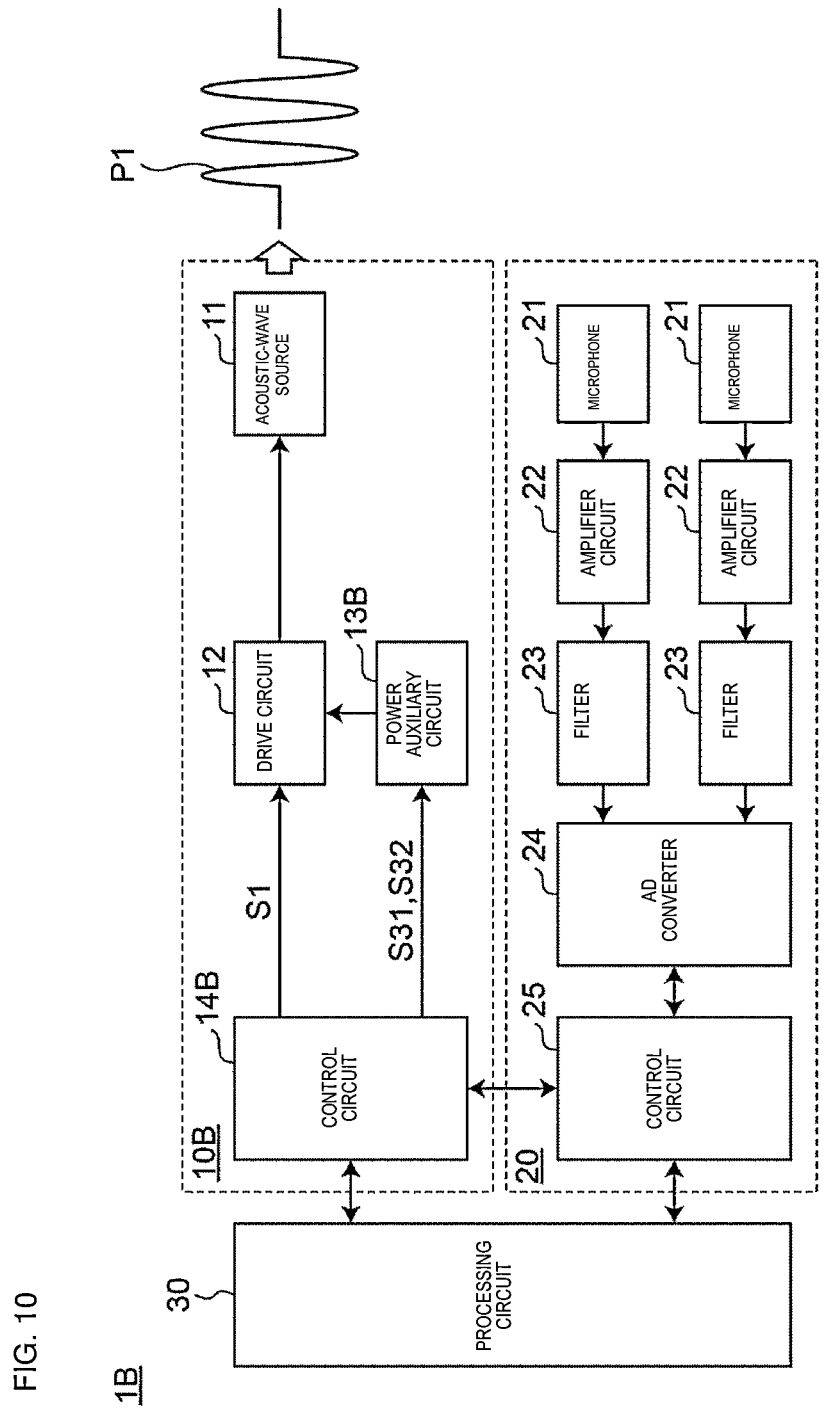
FIG. 10 is a block diagram illustrating an exemplary configuration of an object detection system including an acoustic-wave generating device according to a third preferred embodiment of the present invention.

FIG. 10 is a block diagram illustrating an exemplary configuration of an object detection system 1B including an acoustic-wave generating device 10B according to a third preferred embodiment of the present invention. As illustrated in FIG. 10, the object detection system 1B includes the acoustic-wave generating device 10B, the wave receiving device 20, and the processing circuit 30.

Figure 11:
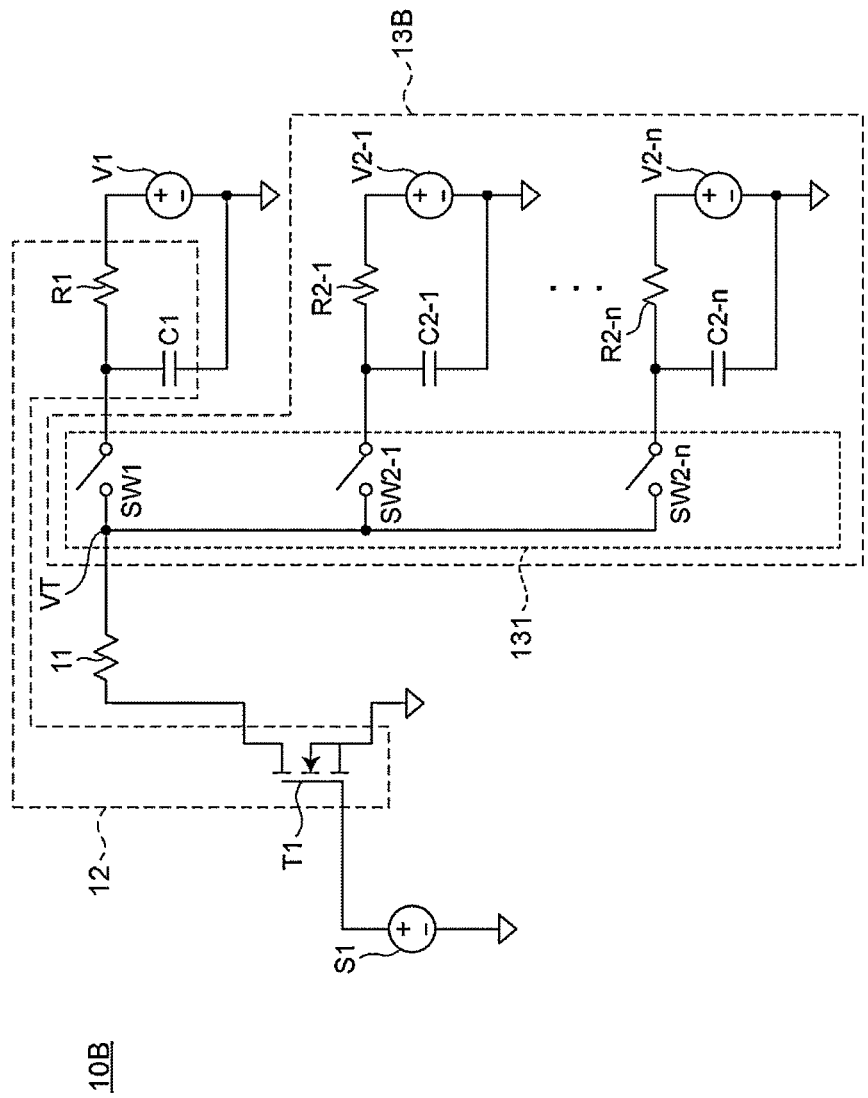
FIG. 11 is a circuit diagram illustrating an exemplary configuration of the acoustic-wave generating device in FIG. 10.

FIG. 11 is a circuit diagram illustrating an exemplary configuration of the acoustic-wave generating device 10B. As illustrated in FIGS. 10 and 11, the acoustic-wave generating device 10B includes the acoustic-wave source 11, the drive circuit 12, a power auxiliary circuit 13B, and a control circuit 14B. In FIG. 11, the control circuit 14B is not illustrated.

The power auxiliary circuit 13B is used to supply power to the drive circuit 12 so as to avoid a decrease of power supplied to the acoustic-wave source 11 in an operation of generating a series of acoustic waves P1 from the acoustic-wave source 11 through switching of the drive switching device T1.

The power auxiliary circuit 13B includes multiple auxiliary capacitors C2-1 to C2-$n$, a selector circuit 131, and multiple auxiliary resistors R2-1 to R2-$n$.

The auxiliary capacitors C2-1 to C2-$n$ are charged by using corresponding auxiliary direct-current power supplies V2-1 to V2-$n$. The auxiliary capacitors C2-1 to C2-$n$ are used instead of the capacitor C1 to supply power to the acoustic-wave source 11. The auxiliary capacitors C2-1 to C2-$n$ are electrically connected between the ground and the respective connection points between the auxiliary direct-current power supplies V2-1 to V2-$n$ and the acoustic-wave source 11. The auxiliary capacitors C2-1 to C2-$n$ are charged by using the auxiliary direct-current power supplies V2-1 to V2-$n$. The voltage values across the ends of the auxiliary capacitors C2-1 to C2-$n$ in the stationary state may be considered to be equal or substantially equal to the voltage values of the auxiliary direct-current power supply C2-1 to C2-n. The auxiliary capacitors C2-1 to C2-n are, for example, electrolytic capacitors or ceramic capacitors.

The auxiliary direct-current power supplies V2-1 to V2-n include, for example, various power supply circuits and/or batteries. Examples of various power supply circuits include an AC/DC converter, a DC/DC converter, a regulator, and a battery. The voltage value of each auxiliary direct-current power supply V2 is, for example, about 5 V.

The auxiliary resistors R2-1 to R2-n define overcurrent protective elements which are electrically connected between the auxiliary capacitors C2-1 to C2-n and the auxiliary direct-current power supplies V2-1 to V2-n. The auxiliary resistors R2-1 to R2-n limit currents flowing from the auxiliary direct-current power supplies V2-1 to V2-n directly to the acoustic-wave source 11. The auxiliary resistors R2-1 to R2-n enable prevention of excessive heating of the acoustic-wave source 11. The resistance value of each of the auxiliary resistors R2-1 to R2-n is, for example, greater than or equal to about 50Ω or less than or equal to about 5 kΩ.

The selector circuit 131 selects, as a source of supply of power to the acoustic-wave source 11, from the capacitor C1 of the drive circuit 12 and the auxiliary capacitors C2-1 to C2-n of the power auxiliary circuit 13B. More specifically, the selector circuit 131 electrically connects at least one of the one or more auxiliary capacitors C2-1 to C2-n, instead of the capacitor C1 of the drive circuit 12, to the acoustic-wave source 11 so that power supplied to the acoustic-wave source 11 does not decrease in an operation of generating a series of acoustic waves P1 from the acoustic-wave source 11 through switching of the drive switching device T1. This configuration achieves stabilization of the sound pressure of a series of acoustic waves P1.

As illustrated in FIG. 11, the selector circuit 131 includes a main switch SW1 and multiple auxiliary switches SW2-1 to SW2-n. The main switch SW1 is electrically connected between the acoustic-wave source 11 and the capacitor C1. The auxiliary switches SW2-1 to SW2-n are electrically connected between the acoustic-wave source 11 and the auxiliary capacitors C2-1 to C2-n, respectively. The selector circuit 131 switches on the main switch SW1 or one of the auxiliary switches SW2-1 to SW2-n, and switches off the remaining ones. Thus, the capacitor C1 of the drive circuit 12 or one of the auxiliary capacitors C2-1 to C2-n of the power auxiliary circuit 13B is electrically connected to the acoustic-wave source 11.

The control circuit 14B controls the drive circuit 12 and the power auxiliary circuit 13B.

The control circuit 14B controls switching (on/off) of the drive switching device T1 of the drive circuit 12. The control circuit 14B controls the drive switching device T1 of the drive circuit 12 to perform an operation of generating a series of acoustic waves P1 from the acoustic-wave source 11. As illustrated in FIG. 10, the control circuit 14 outputs the drive signal S1 for controlling switching of the drive switching device T1. In the present preferred embodiment, the drive switching device T1 is a MOSFET and the drive signal S1 is input to the gate of the drive switching device T1. In FIG. 11, the drive signal S1 is illustrated as a direct-current power supply.

The control circuit 14B controls the selector circuit 131 of the power auxiliary circuit 13B. The control circuit 14B controls the main switch SW1 and the auxiliary switches SW2-1 to SW2-n of the selector circuit 131, and thus supplies power to the drive circuit 12 so as to avoid a decrease of power supplied to the acoustic-wave source 11. In the present preferred embodiment, the control circuit 14B electrically connects at least one of the one or more auxiliary capacitors C2-1 to C2-n, instead of the capacitor C1 of the drive circuit 12, to the acoustic-wave source 11 so as to avoid the state in which the voltage VT applied to the acoustic-wave source 11 is less than or equal to a predetermined value. More specifically, the control circuit 14B electrically connects the capacitor C1 of the drive circuit 12 or one of the auxiliary capacitors C2-1 to C2-n of the power auxiliary circuit 13B to the acoustic-wave source 11 so as to avoid the state in which the voltage VT applied to the acoustic-wave source 11 is less than or equal to the predetermined value. The predetermined value is set so that power supplied to the acoustic-wave source 11 does not decrease. That is, the control circuit 14B alternately uses the capacitor C1 of the drive circuit 12 and the auxiliary capacitors C2-1 to C2-n of the power auxiliary circuit 13B so as to avoid a decrease of power supplied to the acoustic-wave source 11.

Figure 12:
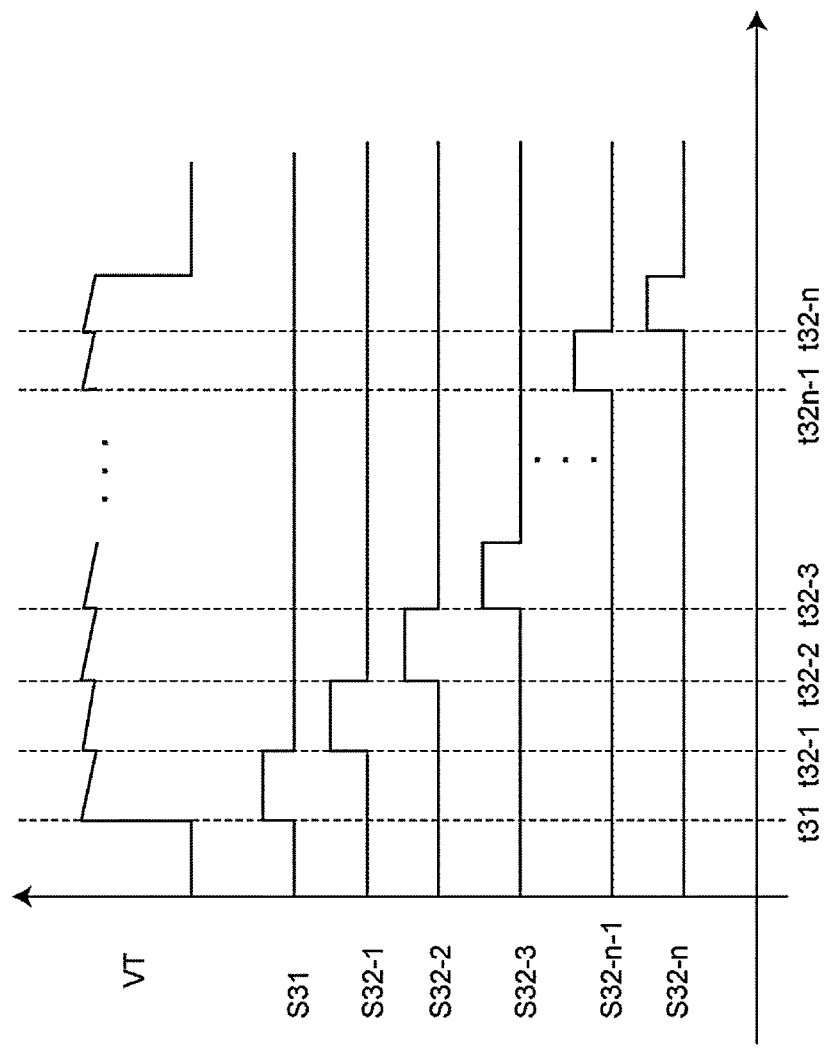
FIG. 12 is a waveform diagram for describing operations of the acoustic-wave generating device in FIG. 11.
Figure 13:
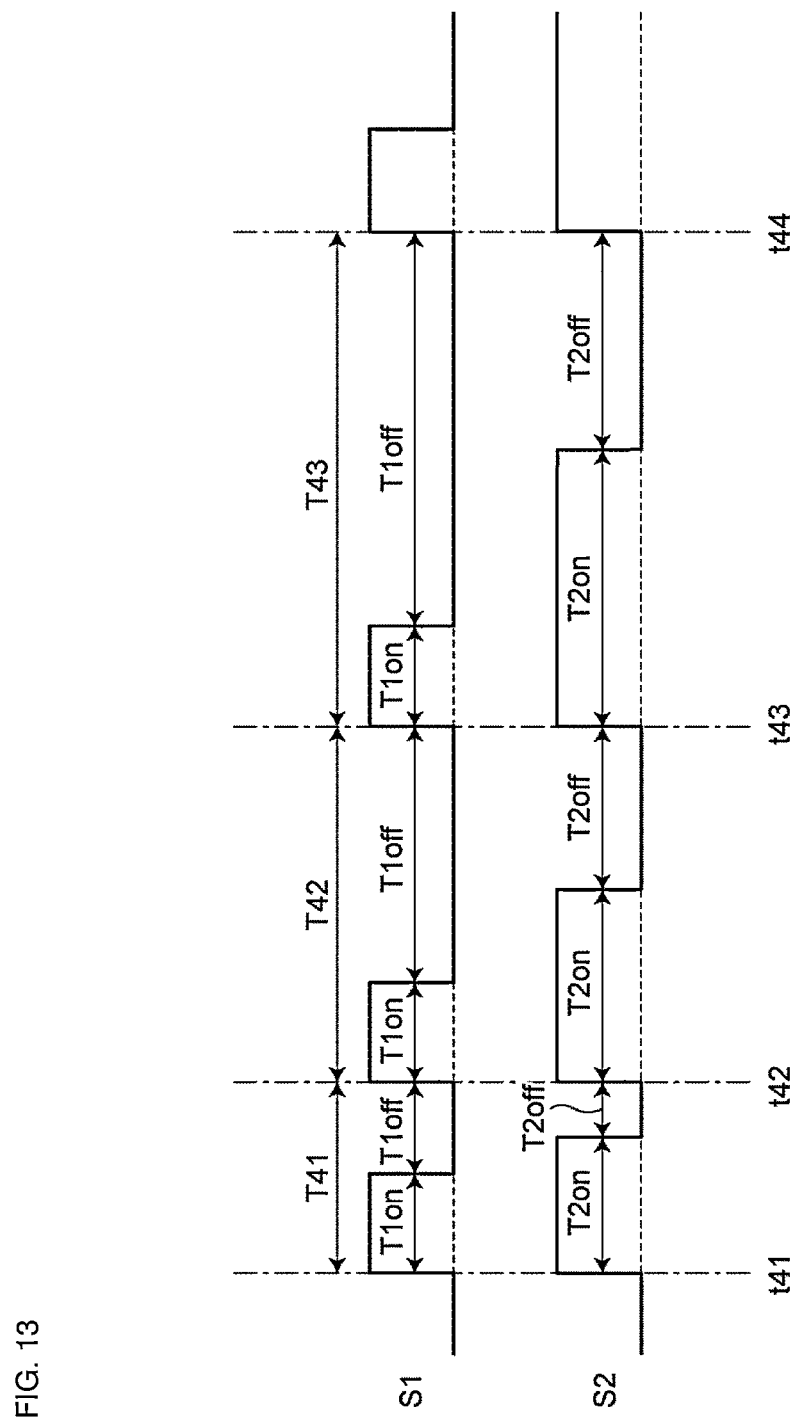
FIG. 13 is a waveform diagram for describing operations of an acoustic-wave generating device according to a modified example of a preferred embodiment of the present invention.

The control circuit 14B's control of the power auxiliary circuit 13B will be described in detail by referring to FIG. 12. FIG. 12 is a timing chart for describing operations of the acoustic-wave generating device 10. As illustrated in FIG. 12, the control circuit 14B outputs a drive signal S31 to control the main switch SW1 of the selector circuit 131 and drive signals S32-1 to S32-n (hereinafter collectively designated with reference numeral S32) to control the auxiliary switches SW2-1 to SW2-n of the selector circuit 131. While the drive signal S31 is at the high level, the main switch SW1 is ON. While the drive signal S31 is at the low level, the main switch SW1 is OFF. While a drive signal S32 is at the high level, the corresponding auxiliary switch SW2 is ON. While a drive signal S32 is at the low level, the corresponding auxiliary switch SW2 is OFF.

The control circuit 14B sets the drive signal S31 to the high level at time t31, and sets the drive signals S32-1 to S32-n to the low level. Thus, only the main switch SW1 is switched on. This causes only the capacitor C1 of the drive circuit 12 to be electrically connected to the acoustic-wave source 11, allowing power to be supplied from the capacitor C1 to the acoustic-wave source 11. At time t31, the voltage VT applied to the acoustic-wave source 11 is equal to the voltage across the ends of the capacitor C1. Energy accumulated in the capacitor C1 is consumed while a series of acoustic waves P1 are generated from the acoustic-wave source 11 through switching of the drive switching device T1, resulting in a decrease of the voltage VT.

After time t31, at time t32-1 before the voltage VT is less than or equal to the predetermined value, the control circuit 14B sets the drive signal S32-1 to the high level and sets the drive signals S31 and S32-2 to S32-n to the low level. Thus, the control circuit 14B switches on only the auxiliary switch SW2-1. This causes only the auxiliary capacitor C2-1 of the power auxiliary circuit 13 to be electrically connected to the acoustic-wave source 11, allowing power to be supplied from the auxiliary capacitor C2-1 to the acoustic-wave source 11. Therefore, the voltage VT applied to the acoustic-wave source 11 at time t32-1 is equal to the voltage across the ends of the auxiliary capacitor C2-1. Energy accumulated in the auxiliary capacitor C2-1 is consumed while a series of acoustic waves P1 are generated from the acoustic-wave source 11 through switching of the drive switching device T1, resulting in a decrease of the voltage VT.

After time t32-1, at time t32-2 before the voltage VT is less than or equal to the predetermined value, the control circuit 14B sets the drive signal S32-2 to the high level, and sets the drive signals S31, S32-1, S32-3 to S32-n to the low level. Thus, the control circuit 14B switches on only the auxiliary switch SW2-2. This causes only the auxiliary capacitor C2-2 of the power auxiliary circuit 13 to be electrically connected to the acoustic-wave source 11, allowing power to be supplied from the auxiliary capacitor C2-2 to the acoustic-wave source 11. Therefore, the voltage VT applied to the acoustic-wave source 11 at time t32-2 is equal or substantially equal to the voltage across the ends of the auxiliary capacitor C2-2. Energy accumulated in the auxiliary capacitor C2-2 is consumed while a series of acoustic waves P1 are generated from the acoustic-wave source 11 through switching of the drive switching device T1, resulting in a decrease of the voltage VT.

After that, at each time t32-3, t32-n-1, t32-n before the voltage VT is less than or equal to the predetermined value, the control circuit 14B sets only the corresponding drive signal S32-3, . . . , S32-n-1, S32-n to the high level, and switches on only the corresponding auxiliary switch SW2-3, . . . , SW2-n-1, SW2-n.

Thus, to avoid the state in which the voltage VT applied to the acoustic-wave source 11 is less than or equal to the predetermined value, the control circuit 14B outputs the drive signals 31, 32-1, and 32-n so that the main switch SW1 or one of the auxiliary switches SW2-1 to SW2-n is ON and the remaining ones are OFF.

Therefore, even when a series of acoustic waves P1 are generated from the acoustic-wave source 11, the acoustic-wave generating device 10B may avoid a decrease of power supplied to acoustic-wave source 11, allowing a series of acoustic waves P1 to be generated with a stable sound pressure.

3-2. Advantageous Effects and the Like

In the acoustic-wave generating device 10B described above, the power auxiliary circuit 13B includes the auxiliary capacitors C2-1 to C2-n, which are charged by using the auxiliary direct-current power supplies V2-1 to V2-n, respectively, and the selector circuit 131. The selector circuit 131 electrically connects at least one of the auxiliary capacitors C2-1 to C2-n, instead of the capacitor C1 of the drive circuit 12, to the acoustic-wave source 11 so that power supplied to the acoustic-wave source 11 does not decrease in an operation of generating a series of acoustic waves P1 from the acoustic-wave source 11 through switching of the drive switching device T1. This configuration achieves stabilization of the sound pressure of a series of acoustic waves P1.

Modified Examples

Preferred embodiments of the present invention are not limited to those described above. In the preferred embodiments described above, various changes may be made in accordance with design or the like as long as the advantageous of the present invention are achieved. Modified examples of the preferred embodiments described above will be described below. The modified examples described below may be appropriately combined with each other for application.

In the first preferred embodiment, the frequency of a series of acoustic waves P is constant or substantially constant. However, the frequency is not necessarily constant or substantially constant. For example, the frequency of a series of acoustic waves P may change with time (for example, increase or decrease). FIG. 12 is a waveform diagram for describing operations of an acoustic-wave generating device according to a modified example. In FIG. 12, the drive signal S1 is a pulse signal whose frequency decreases (whose cycle increases) with time. In FIG. 12, the cycle of the drive signal S1 increases gradually at T41, T42, T43, etc. In FIG. 12, the ON period T1on is constant or substantially constant, but the OFF period T1off increases as the cycle increases. The drive signal S1 may be a pulse signal whose frequency increases (whose cycle decreases) with time. That is, the drive signal S1 may be a pulse signal whose frequency increases or decreases with time. Such a signal is called, for example, a chirp signal. Compared with the case of use of a pulse signal whose frequency does not change with time, use of a chirp signal may decrease side lobes of the cross-correlation function. Therefore, the main lobe of the cross-correlation function may be distinguished from the side lobes, achieving improvement of accuracy of detection of an object.

In FIG. 12, the drive signal S2 is synchronized with the drive signal S1. Therefore, the cycle of the drive signal S2 is equal or substantially equal to that of the drive signal S1. If the drive signal S2 has a long ON period T2on, more energy may be accumulated in the inductor L1 of the power auxiliary circuit 13. In view of this, the ON period T2on of the drive signal S2 may be set in accordance with the cycle of the drive signal S1. In FIG. 12, since the cycle of the drive signal S1 increases, the ON period T2on of the drive signal S2 is also increased. Thus, the ON period T2on of the drive signal S2 is not necessarily constant, and may be set in accordance with the cycle of the drive signal S1.

In the second preferred embodiment, the acoustic-wave generating device 10A includes two sets of a drive circuit 12 and a power auxiliary circuit 13. However, the number of sets of a drive circuit 12 and a power auxiliary circuit 13 may be three or more. In a modified example, the acoustic-wave generating device 10A may perform an operation of generating a series of acoustic waves P1 from the acoustic-wave source 11 through alternate switching of the drive switching devices T1 of multiple drive circuits 12. In an operation of generating a series of acoustic waves P1, the power auxiliary circuits 13 may supply power to the respective drive circuits 12 so as to avoid a decrease of power supplied to the acoustic-wave source 11.

In the third preferred embodiment, the number of auxiliary direct-current power supplies V2-1 to V2-n and the number of auxiliary capacitors C2-1 to C2-n are not particularly limited. In a modified example, the power auxiliary circuit 13B may include one or more auxiliary capacitors C2-1 to C2-n charged by using one or more auxiliary direct-current power supplies V2-1 to V2-n, respectively, and the selector circuit 131. The selector circuit 131 may electrically connect at least one of the one or more auxiliary capacitors C2-1 to C2-n, instead of the capacitor C1 of the drive circuit 12, to the acoustic-wave source 11 so that power supplied to the acoustic-wave source 11 does not decrease in an operation of generating a series of acoustic waves P1 from the acoustic-wave source 11 through switching of the drive switching device T1. This configuration achieves stabilization of the sound pressure of a series of acoustic waves P1.

In a modified example, instead of the resistor R1, another overcurrent protective element may be used. Examples of an overcurrent protective element include a current fuse, a fuse resistor, and a bimetal. The overcurrent protective element is not necessarily included.

INDUSTRIAL APPLICABILITY

Preferred embodiments of the present invention may be applied to an acoustic-wave generating device. Specifically, preferred embodiments of the present invention may be applied to an acoustic-wave generating device in which power is supplied from a capacitor to an acoustic-wave source which produces heat through energization to generate acoustic waves.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An acoustic-wave generating device comprising:
   a drive circuit including a capacitor and a drive switch, the capacitor being chargeable via a direct-current power supply, and the drive switch being operable to cause power to be supplied from the capacitor to an acoustic-wave source which produces heat through energization to generate an acoustic wave; and
   a power auxiliary circuit to supply power to the drive circuit to avoid a decrease of power supplied to the acoustic-wave source in an operation of generating a series of acoustic waves from the acoustic-wave source through switching of the drive switch.

2. The acoustic-wave generating device according to claim 1, wherein the power auxiliary circuit is operable to supply power to the drive circuit in an OFF period of the drive switch.

3. The acoustic-wave generating device according to claim 2, wherein the power auxiliary circuit is operable to charge the capacitor in the OFF period of the drive switch.

4. The acoustic-wave generating device according to claim 3, wherein
   the power auxiliary circuit includes:
      an inductor electrically connected between the direct-current power supply and the capacitor; and
      a charging switch electrically connected in parallel to a series circuit of the inductor and the direct-current power supply.

5. The acoustic-wave generating device according to claim 4, wherein
   the power auxiliary circuit includes a diode;
   the diode is electrically connected, at an anode thereof, to the inductor; and
   the diode is electrically connected, at a cathode thereof, to the capacitor.

6. The acoustic-wave generating device according to claim 4, wherein the charging switch is ON during an ON period of the drive switch, and is switched off in the OFF period of the drive switch.

7. The acoustic-wave generating device according to claim 6, wherein the drive switch and the charging switch are switched on simultaneously.

8. The acoustic-wave generating device according to claim 1, wherein the drive circuit includes an overcurrent protector electrically connected between the capacitor and the direct-current power supply.

9. The acoustic-wave generating device according to claim 1, wherein
   the drive circuit includes a plurality of drive circuits;
   the power auxiliary circuit includes a plurality of power auxiliary circuits;
   the acoustic-wave generating device includes the plurality of drive circuits and the plurality of power auxiliary circuits corresponding to respective drive circuits; and
   the plurality of power auxiliary circuits supply power to the respective drive circuits so as to avoid a decrease of power supplied to the acoustic-wave source in an operation of generating a series of acoustic waves from the acoustic-wave source through alternate switching of the drive switches of the drive circuits.

10. The acoustic-wave generating device according to claim 1, wherein the power auxiliary circuit includes:
    one or more auxiliary capacitors to be charged by one or more auxiliary direct-current power supplies correspondingly; and
    a selector circuit electrically connected, to the acoustic-wave source, at least one of the one or more auxiliary capacitors, instead of the capacitor of the drive circuit, so as to avoid a decrease of power supplied to the acoustic-wave source in an operation of generating a series of acoustic waves from the acoustic-wave source through switching of the drive switch.

11. The acoustic-wave generating device according to claim 1, wherein the switching frequency of the drive switch is greater than or equal to about 20 kHz.

12. The acoustic-wave generating device according to claim 1, further comprising:
    a control circuit to control the drive circuit and the power auxiliary circuit; wherein
    the control circuit is operable to control the power auxiliary circuit so as to cause the power auxiliary circuit to supply power to the drive circuit to avoid a decrease of power supplied to the acoustic-wave source, while controlling switching of the drive switch of the drive circuit so as to cause the acoustic-wave source to generate a series of acoustic waves.

13. An acoustic-wave generating device comprising:
    a drive circuit including a capacitor and a drive switch, the capacitor being chargeable via a direct-current power supply, the drive switch being operable to cause power to be supplied from the capacitor to an acoustic-wave source which produces heat through energization to generate an acoustic wave; and
    a power auxiliary circuit including an inductor and a charging switch and that supplies power to the drive circuit in an OFF period of the drive switch in an operation of generating a series of acoustic waves from the acoustic-wave source through switching of the drive switch, the inductor being electrically connected between the direct-current power supply and the capacitor, and the charging switch being electrically connected in parallel to a series circuit of the inductor and the direct-current power supply.

14. The acoustic-wave generating device according to claim 13, wherein
    the power auxiliary circuit includes a diode;
    the diode is electrically connected, at an anode thereof, to the inductor; and
    the diode is electrically connected, at a cathode thereof, to the capacitor.

15. The acoustic-wave generating device according to claim 13, wherein the charging switch is ON during an ON period of the drive switch, and is switched off in the OFF period of the drive switch.

16. The acoustic-wave generating device according to claim 15, wherein the drive switch and the charging switch are switched on simultaneously.

17. The acoustic-wave generating device according to claim 16, wherein the charging switch is switched off after the drive switch is switched off.

18. The acoustic-wave generating device according to claim 13, wherein
Vc represents a voltage across both ends of the capacitor in a stationary state, Rth represents a resistance value of the acoustic-wave source, tAon represents a length of an ON period of the drive switch, imax represents a maximum of a current which is output from the inductor in an OFF period of the charging switch, and L represents a self-inductance of the inductor; and
L satisfies an expression:

$$L = \frac{2 \times Vc^2 \times tAon}{Rth \times imax^2}.$$

19. The acoustic-wave generating device according to claim 13, wherein
V represents a voltage of the direct-current power supply, tBon represents a length of an ON period of the charging switch, imax represents a maximum of a current which is output from the inductor in an OFF period of the charging switch, L represents a self-inductance of the inductor; and
the direct-current power supply is set so as to satisfy an expression:

$$imax = \frac{V \times tBon}{L}.$$

20. The acoustic-wave generating device according to claim 13, wherein
the drive circuit includes a plurality of drive circuits;
the power auxiliary circuit includes a plurality of power auxiliary circuits;
the acoustic-wave generating device includes the plurality of drive circuits and the plurality of power auxiliary circuits corresponding to respective drive circuits; and
each of the plurality of power auxiliary circuits supplies power to a corresponding one of the plurality of drive circuits in an OFF period of the drive switch of the corresponding drive circuit in an operation of generating a series of acoustic waves from the acoustic-wave source through alternate switching of the drive switches of the drive circuits.

\* \* \* \* \*